(12) United States Patent
Cilia et al.

(10) Patent No.: US 11,618,216 B2
(45) Date of Patent: Apr. 4, 2023

(54) ADDITIVE MANUFACTURING SYSTEMS AND METHODS INCLUDING ROTATING BINDER JET PRINT HEAD

(71) Applicant: General Electric Company, Schenectady, NY (US)

(72) Inventors: Juan Pablo Cilia, Delmar, NY (US); John P. Davis, Duanesburg, NY (US); William Thomas Carter, Jr., Galway, NY (US); Jared Micheal Iverson, Tremonton, UT (US); Michael Robert Tucker, Niskayuna, NY (US); Michael Evans Graham, Slingerlands, NY (US); Edward James Nieters, Burnt Hills, NY (US); Christopher James Kenny, Schoharie, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/007,345

(22) Filed: Aug. 31, 2020

(65) Prior Publication Data

US 2022/0063188 A1 Mar. 3, 2022

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/209* (2017.08); *B29C 64/214* (2017.08); *B33Y 10/00* (2014.12); *B33Y 30/00* (2014.12)

(58) Field of Classification Search
None
See application file for complete search history.

(56) References Cited

U.S. PATENT DOCUMENTS 7,291,002 B2 11/2007 Russell et al.
2002/0122839 A1* 9/2002 Chapman ................ B29C 41/12
425/174.4
(Continued)

FOREIGN PATENT DOCUMENTS

CN 105710309 A 6/2016
CN 207859497 U 9/2018
(Continued)

OTHER PUBLICATIONS

Balakrishna et al., Design and Fabrication of Powder Based Binder Jetting 3D Printer, International Journal of Recent Trends in Engineering & Research (IJRTER), vol. 3, Issue 9, Sep. 2017, pp. 142-150.

(Continued)

*Primary Examiner* — Timothy Kennedy
*Assistant Examiner* — Farah Taufiq
(74) *Attorney, Agent, or Firm* — Dority & Manning, P.A.

(57) ABSTRACT

An additive manufacturing system includes a build platform, a particulate dispenser assembly configured to dispense or remove particulate to or from the build platform, and a plurality of print heads each having at least one binder jet. The binder jets are configured to dispense at least one binder in varying densities onto the particulate in multiple locations to consolidate the particulate to form the component with a variable binder density throughout. The system also includes a plurality of arms extending at least partially across the build platform and supporting the print heads and at least one actuator assembly configured to rotate the print heads and/or the build platform about a rotation axis and move at least one of the print heads and the build platform in a build direction perpendicular to the build platform as part of a helical build process for the component.

18 Claims, 22 Drawing Sheets

(51) Int. Cl.
  *B33Y 30/00*      (2015.01)
  *B29C 64/214*     (2017.01)
  *B29C 64/209*     (2017.01)

(56) References Cited

U.S. PATENT DOCUMENTS

| | | | | |
|---|---|---|---|---|
| 2004/0265413 | A1* | 12/2004 | Russell | B41J 2/16579 |
| | | | | 425/375 |
| 2015/0183161 | A1 | 7/2015 | Molinari et al. | |
| 2017/0056970 | A1* | 3/2017 | Chin | B33Y 30/00 |
| 2017/0190112 | A1* | 7/2017 | Thorson | B33Y 30/00 |
| 2018/0050499 | A1 | 2/2018 | Makover et al. | |
| 2018/0370213 | A1* | 12/2018 | Gold | B29C 64/321 |
| 2020/0038952 | A1* | 2/2020 | Stuart | B29C 64/329 |

FOREIGN PATENT DOCUMENTS

| | | | |
|---|---|---|---|
| WO | WO2004/106041 | A2 | 12/2004 |
| WO | WO2017/008777 | A1 | 1/2017 |
| WO | WO2020/002951 | A1 | 1/2020 |

OTHER PUBLICATIONS

Gibson et al., Binder Jetting, Additive Manufacturing Technologies, New York, 2015, pp. 205-218.
European Search Report for EP Application No. 21193285.0, dated Jan. 24, 2021.

* cited by examiner

ADDITIVE MANUFACTURING SYSTEMS AND METHODS INCLUDING ROTATING BINDER JET PRINT HEAD

FIELD

The present disclosure relates in general to additive manufacturing systems and, more particularly, to additive manufacturing systems including a binder jet print head that rotates relative to a build platform.

BACKGROUND

At least some known additive manufacturing systems involve the consolidation of a particulate to fabricate a component. Such techniques facilitate producing complex components from particulate materials at a reduced cost and with improved manufacturing efficiency. At least some known additive manufacturing systems fabricate components using one or more binder jet print heads that dispense a binder onto a particulate. In addition, in at least some additive manufacturing systems, one or more actuators are used to move the build platform during fabrication of the component. However, the size of the fabricated components is limited by the configuration of the binder jet print heads, the actuators, and the build platform.

In addition, in at least some known additive manufacturing systems, a recoater is used to distribute the particulate on the build platform. For example, in some embodiments, a recoater moves the particulate from a container onto and across the build platform. The recoater and the binder jet print head are operated at separate times, because the binder jet print head cannot consolidate the particulate while the recoater is spreading the particulate. As a result, the time required for fabricating the components is increased to accommodate sequential operation of the recoater and the binder jet print head.

Accordingly, there is a need for an improved additive manufacturing system and methods of operating same. In particular, an additive manufacturing system that includes a binder jet print head that allows for fabrication of components of any size and having varying characteristics (e.g. strength, stiffness, materials, etc.) throughout in a reduced time would be welcomed in the art.

BRIEF DESCRIPTION

Aspects and advantages of the disclosure will be set forth in part in the following description, or may be obvious from the description, or may be learned through practice of the disclosure.

In one aspect, the present disclosure is directed to an additive manufacturing system. The additive manufacturing system includes a build platform configured to receive a particulate, a particulate dispenser assembly configured to dispense or remove the particulate to or from the build platform, and a plurality of print heads each having at least one binder jet. The binder jets of the plurality of print heads are configured to dispense at least one binder in varying densities onto the particulate in multiple locations to consolidate at least a portion of the particulate to form the component having a variable binder density throughout. The additive manufacturing system also includes a plurality of arms extending at least partially across the build platform and configured to support the plurality of print heads and at least one actuator assembly configured to rotate at least one of the plurality of print heads and the build platform about a rotation axis extending through the build platform and move at least one of the plurality of print heads and the build platform in a build direction perpendicular to the build platform as part of a helical build process for the component.

In another aspect, the present disclosure is directed to a method of fabricating a component using an additive manufacturing system. The method includes depositing a particulate on a build platform, rotating at least one recoater blade relative to the build platform about a rotation axis extending through the build platform so as to disperse the particulate onto the build platform, rotating a plurality of print heads relative to the build platform about the rotation axis, the plurality of print heads each including at least one nozzle, and dispensing, via a plurality of binder jets of a plurality of print heads, at least one of binder in varying densities onto the particulate in multiple locations to consolidate at least a portion of the particulate to form the component having a variable binder density throughout.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
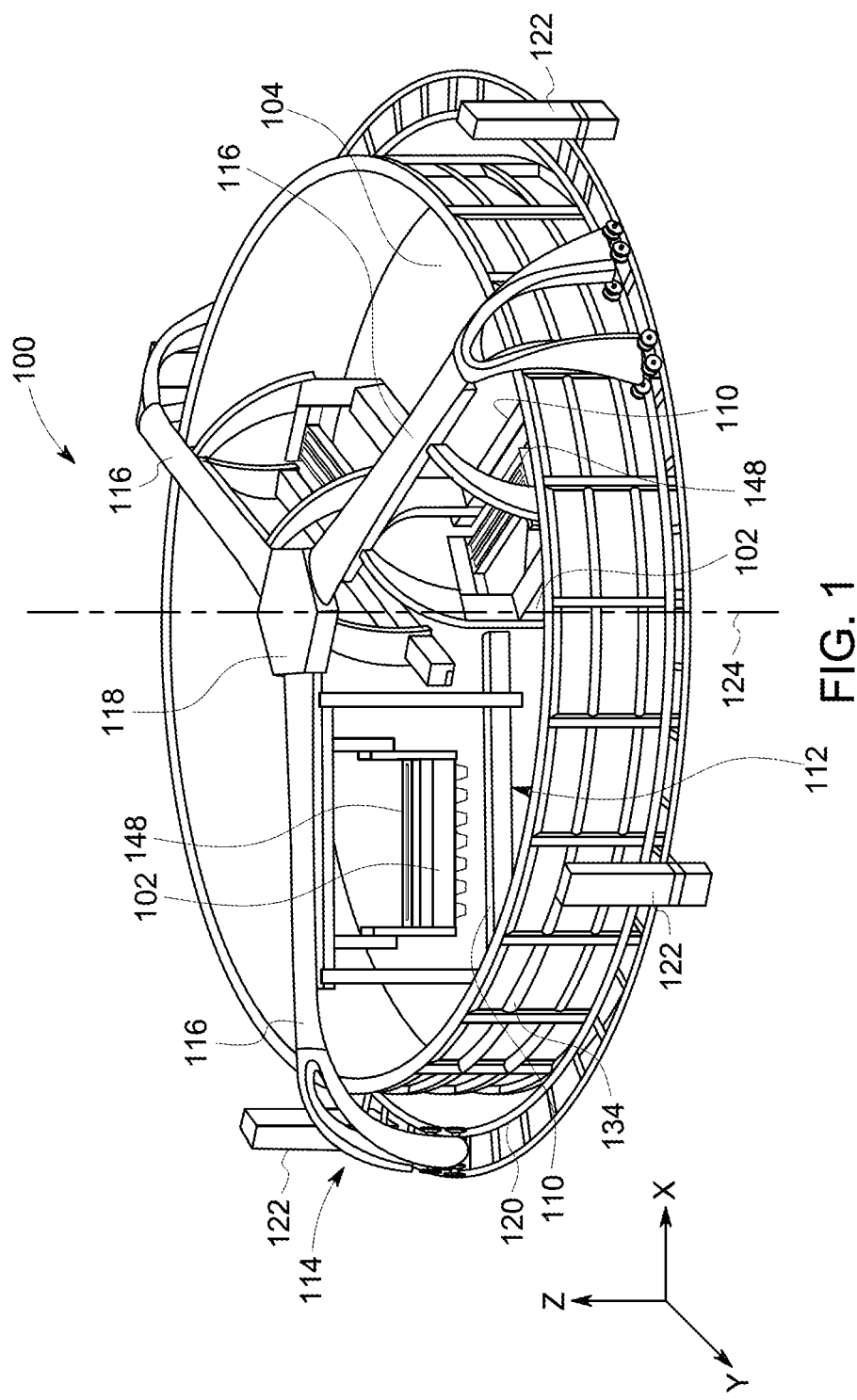
FIG. 1 illustrates a perspective view of one embodiment of an additive manufacturing system including at least one rotating binder jet print head according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the following specification and the claims, reference will be made to a number of terms, which shall be defined to have the following meanings.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

In general, the systems and methods described herein include an additive manufacturing system including a rotating binder jet print head. The binder jet print head is configured to rotate relative to a build platform and dispense a binder onto a particulate to consolidate the particulate. As the binder jet print head operates, a particulate dispenser and a recoater assembly are configured to dispense and spread particulate on the build platform to provide a continuous fabrication process. In addition, the additive manufacturing system includes a support structure that supports the binder jet print head, the particulate dispenser, and the recoater assembly. An actuator is configured to rotate and raise the binder jet print head, the particulate dispenser, and the recoater assembly relative to the build platform as the additive manufacturing system fabricates a component on the build platform. As a result, the additive manufacturing system is able to fabricate objects of any geometric complexity within the size of the printing system. In addition, the additive manufacturing system is able to provide a multiple helix fabrication process which may fabricate the objects in less time than at least some known additive manufacturing systems. Moreover, the additive manufacturing system is able to be shipped to remote sites and assembled because the support structure, binder jet print heads, particulate dispensers, recoater assemblies, and actuators are modular components.

Figure 2:
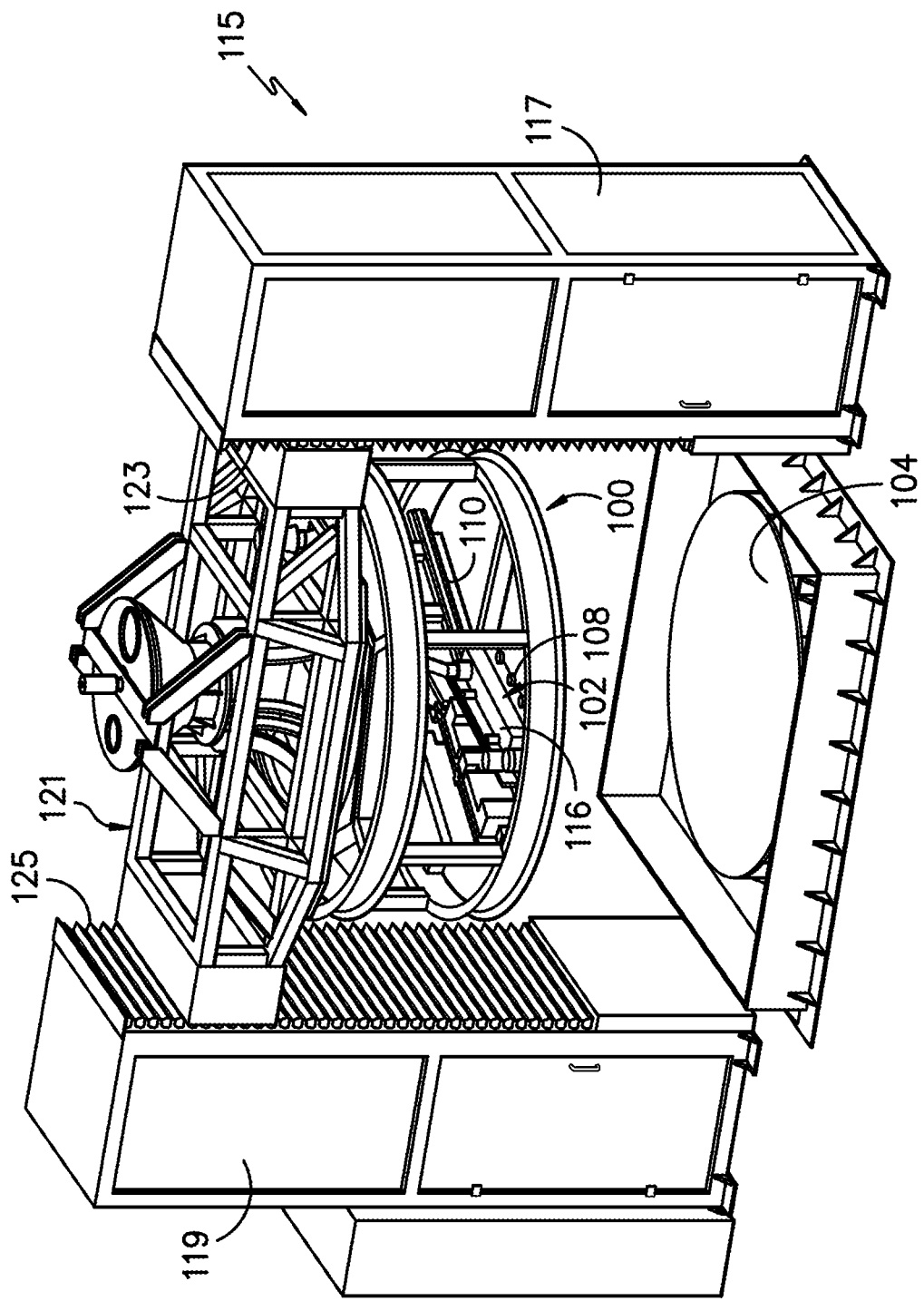
FIG. 2 illustrates a perspective view of another embodiment of an additive manufacturing system including at least one rotating binder jet print head according to the present disclosure.
Figure 3:
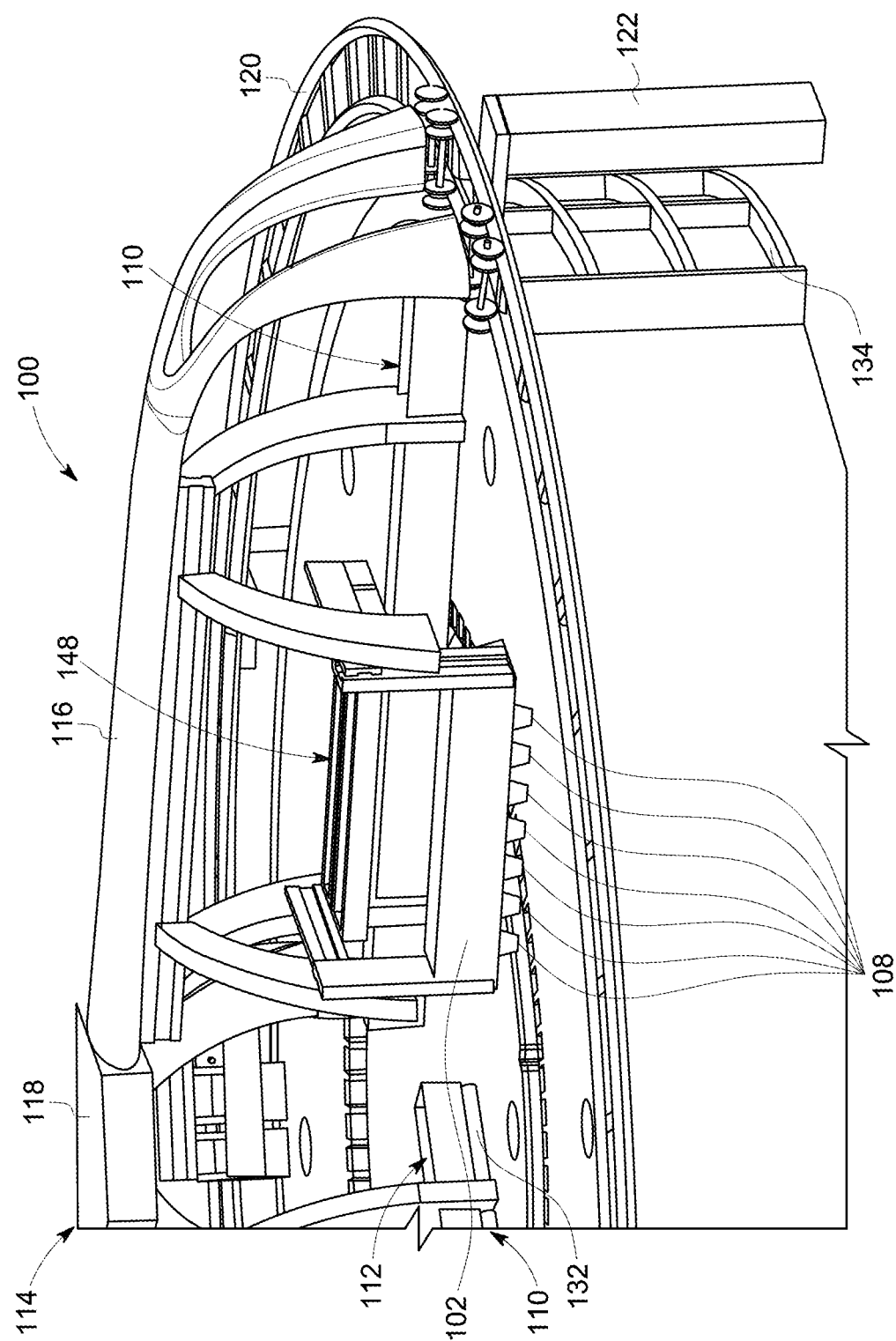
FIG. 3 illustrates an enlarged perspective view of a portion of the additive manufacturing system shown in FIG. 1.
Figure 4:
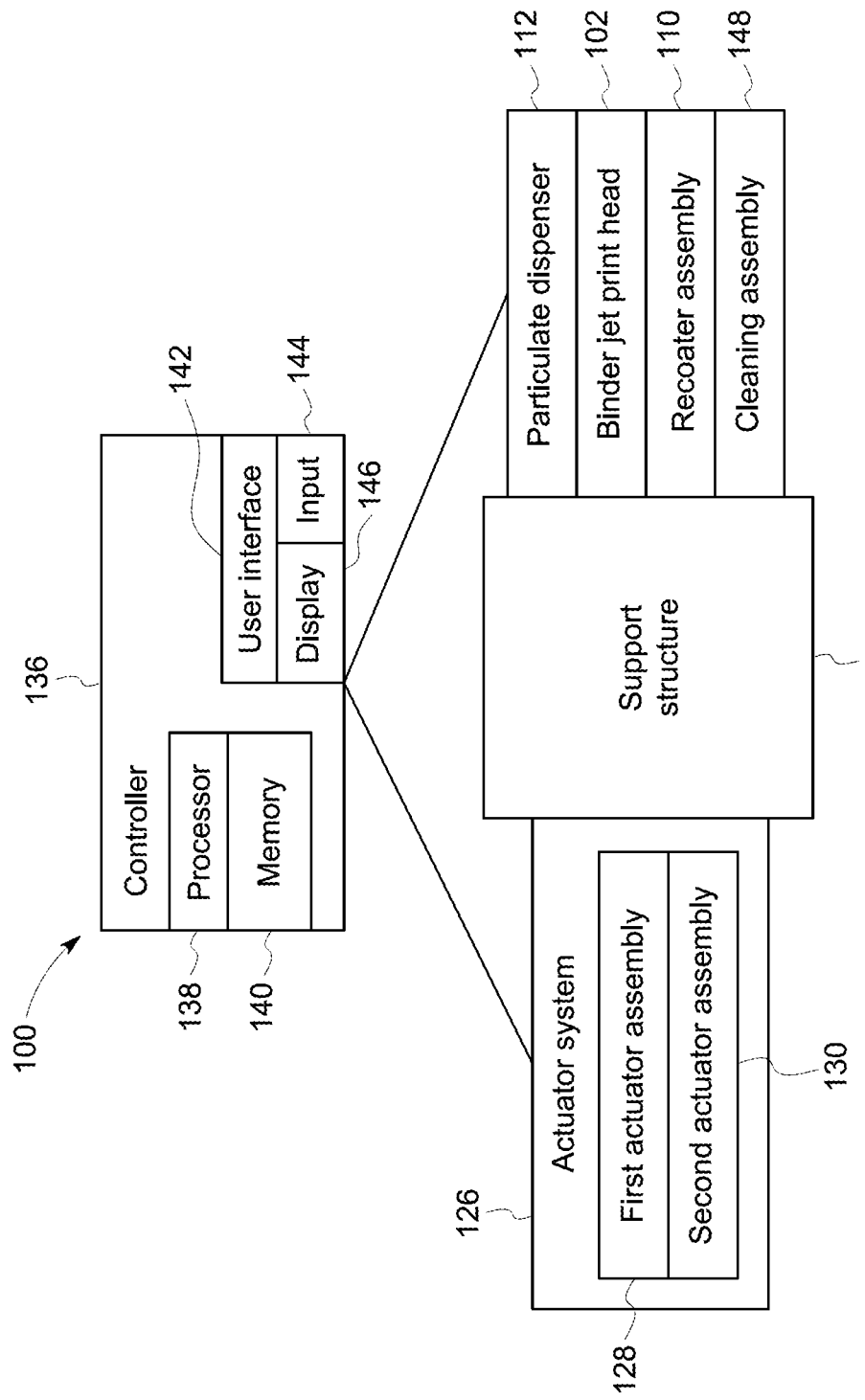
FIG. 4 illustrates a block diagram of the additive manufacturing system shown in FIGS. 1 and 3.

Referring now to the drawings, FIG. 1 illustrates a perspective view of an embodiment of an additive manufacturing system 100 including at least one rotating binder jet print head 102 according to the present disclosure. FIG. 2 illustrates a perspective view of another embodiment of an additive manufacturing system 100 including at least one rotating binder jet print head 102 according to the present disclosure. FIG. 3 illustrates an enlarged perspective view of a portion of additive manufacturing system 100 of FIG. 1. FIG. 4 illustrates a block diagram of an embodiment of the additive manufacturing system 100 according to the present disclosure. As shown particularly in FIG. 1, a coordinate system of the additive manufacturing system 100 includes an X-axis, a Y-axis, and a Z-axis. Thus, the additive manufacturing system 100 is configured to build objects, for example, a mold 500 (shown in FIG. 10) for casting a component 516 (shown in FIG. 11). Though the system 100 described herein may be used to form any suitable component, it should be understood that the system 100 may be particularly useful for forming various wind turbine components.

In an embodiment, the additive manufacturing system 100 includes at least one binder jet print head 102 for consolidating particulate. Further, the additive manufacturing system 100 is configured for fabricating an object or component using an additive manufacturing process by depositing a binder onto particulate from binder jet print heads 102. For example, each binder jet print head 102 includes a plurality of outlets or jets 108 and is configured to dispense a binder through jets 108 onto the particulate. Alternatively, the additive manufacturing system 100 may include any consolidation device that facilitates consolidation of a material using any of the processes and systems described herein.

In an embodiment, the additive manufacturing system 100 further includes at least one recoater assembly 110 and at least one particulate dispenser 112. Each recoater assembly 110 and particulate dispenser 112 may be associated with a respective rotating binder jet print head 102. In one embodiment, the additive manufacturing system 100 includes three recoater assemblies 110, three particulate dispensers 112, and three binder jet print heads 102. In alternative embodiments, the additive manufacturing system 100 may include any number of binder jet print heads 102, recoater assemblies 110, and/or particulate dispensers 112 that enables the additive manufacturing system 100 to operate as described herein. For example, in some embodiments, a single recoater assembly 110 and/or particulate dispenser 112 may be associated with a plurality of binder jet print heads 102. In further embodiments, the additive manufacturing system 100 includes a single binder jet print head 102.

Also, in an embodiment, the binder jet print heads 102, the recoater assemblies 110, and the particulate dispensers 112 may be coupled to and supported by a support structure 114. Further, as shown, the support structure 114 may include at least one arm 116 extending at least partially across build platform 104 and configured to support at least one binder jet print head 102. In an embodiment, the support structure 114 may include a center support 118 and three arms 116 equally spaced about center support 118. The arms 116 extend radially outward from center support 118. Further, the recoater assemblies 110 and the particulate dispensers 112 may be coupled to arms 116 and positioned adjacent associated binder jet print heads 102 on arms 116. In an embodiment, each arm 116 supports one binder jet print head 102, one recoater assembly 110, and one particulate dispenser 112. In alternative embodiments, support structure 114 includes any arm 116 that enables additive manufacturing system 100 to operate as described herein. For example, in some embodiments, the support structure 114 includes arms that support recoater assemblies 110 and/or particulate dispensers 112 and are distinct from arms 116 that support binder jet print heads 102.

Moreover, in an embodiment, as shown in FIGS. 1 and 3, the support structure 114 may further include a track 120 and a plurality of legs 122 that support track 120 at an adjustable height above build platform 104. The track 120 extends around the circumference of the build platform 104 and is configured to support arms 116 as arms 116 are rotated about a rotation axis 124. In addition, the legs 122 are positionable to adjust the height of support structure 114 relative to build platform 104 during operation of the additive manufacturing system 100. For example, the angle of each leg 122 relative to rotation axis 124 is adjustable to change the height of support structure 114 and therefore the distance between build platform 104 and binder jet print heads 102, recoater assemblies 110, and particulate dispensers 112. In some embodiments, a vertical actuator may be used to extend/shorten the length of each leg 122. In alternative embodiments, the additive manufacturing system 100 includes any support structure 114 that enables the additive manufacturing system 100 to operate as described herein.

More specifically, in another embodiment, as shown in FIG. 2, the additive manufacturing system 100 may be secured to a lifting system 115 for lifting and/or lowering the additive manufacturing system 100 relative to build platform 104 such that a component having any suitable height can be manufactured. In particular, as shown, the lifting system 115 may include opposing support structures 117, 119 with a support beam 121 extending therebetween. Further, as shown, each of the support structures 117, 119 may include a rail or track system 123, 125. Moreover, the support beam 121 may be secured to each of the tracks 123, 125 and the additive manufacturing system 100 can be secured to the support beam 121. Accordingly, by raising or lower the support beam 121, the additive manufacturing system 100 can also be raised or lowered to any suitable height. It should be further understood that operation of the lifting system 115 can be accomplished using any suitable control system to automate the system.

During operation of the additive manufacturing system 100, particulate is supplied by particulate dispensers 112 and spread evenly over the build platform 104 using the recoater assemblies 110. Thus, the recoater assemblies 110 are configured to control the height of the particulate relative to the height of the previous revolution of the helix and facilitate removal of excess particulate material. The binder jet print heads 102 consolidate a first portion of particulate to form a cross-sectional layer of a component. Further, the recoater assemblies 110 and the binder jet print heads 102 are able to operate simultaneously to distribute and consolidate particulate because the recoater assemblies 110 are positioned in front of and rotate in coordination with respective binder jet print heads 102. During selective consolidation of the layer of particulate, the support structure 114 is raised to elevate the binder jet print heads 102, the recoater assemblies 110, and the particulate dispensers 112 as particulate is spread over the build platform 104 and the partial component to allow continuous consolidation of particulate by the binder jet print heads 102. The process is continued until the component is completely built up from the consolidated portion of particulate.

Also, in an embodiment, as shown particularly in FIG. 4, at least a portion of the support structure 114 may be moved by an actuator system 126. In an embodiment, the actuator system 126 includes a first actuator assembly 128 and a second actuator assembly 130. For example, in an embodiment, the first actuator assembly 128 is configured to rotate the arm 116 of the support structure 114 about the rotation axis 124 and the second actuator assembly 130 is configured to move arm 116 in the Z-direction (i.e., normal to a top surface of the build platform 104), also referred to as the build direction. In some embodiments, the actuator system 126 is configured to move at least one binder jet print head 102 in a radial direction relative to rotation axis 124. For example, in some embodiments, the binder jet print heads 102 are movable along the length of arms 116 during operation of the additive manufacturing system 100.

In particular embodiments, each actuator assembly 128, 130 includes, for example and without limitation, a linear motor(s), a hydraulic and/or pneumatic piston(s), a screw drive mechanism(s), rotational stages, and/or a conveyor system. In alternative embodiments, the additive manufacturing system 100 includes any actuator system 126 that enables the additive manufacturing system 100 to operate as described herein. For example, in some embodiments, actuator system 126 is configured to rotate build platform 104 about rotation axis 124 and/or move build platform 104 in the build direction.

In addition, in an embodiment, the particulate dispenser 112 is positioned to deposit particulate in front of recoater assembly 110. In alternative embodiments, particulate is deposited onto the build platform 104 in any manner that enables the additive manufacturing system 100 to operate as described herein.

Also, in an embodiment, at least one recoater blade 132 of recoater assembly 110 is positioned to contact particulate in front of the respective binder jet print head 102 and distribute particulate across build platform 104. For example, the recoater blade 132 may extend at least partially along a radius of the build platform 104. In an embodiment, the recoater blade 132 is rotated with the binder jet print head 102 relative to the build platform 104. As a result, the recoater blade 132 contacts particulate and directs particulate along the length of the recoater blade 132 across the build platform 104 during operation of the additive manufacturing system 100. In addition, the recoater assembly 110 is configured to maintain a uniform thickness of each layer of particulate on the build platform 104 above the prior consolidated layer. In some embodiments, each layer may have a thickness in a range of about 10 microns to about 2000 microns. In alternative embodiments, recoater assembly 110 includes any recoater blade 132 that enables the additive manufacturing system 100 to operate as described herein.

Moreover, in an embodiment, the additive manufacturing system 100 further includes a wall 134 extending around build platform 104 to define a build container. In an embodiment, as shown in FIG. 1, the build platform 104 may have a generally circular shape. Further, as shown, the wall 134 may be generally cylindrical and fully surrounds particulate on the build platform 104. In alternative embodiments, the build platform 104 and/or the wall 134 may be any shapes that facilitate operation of the additive manufacturing system 100 as described herein. In further embodiments, the wall 134 may surround a portion of particulate and/or may be coupled to any other wall or component that facilitates operation of the additive manufacturing system 100 as described herein. In addition, in some embodiments, the additive manufacturing system 100 includes an inner particulate containment wall (not shown) that reduces the amount of particulate required to assemble the component. The inner particulate containment wall may be cylindrical. In embodiments including an inner particulate containment wall, particulate may be dispensed adjacent the inner particulate containment wall and consolidated to form a shape such as a pipe shape having a cavity near the central region of build platform 104.

Also, in an embodiment, the binder jet print heads 102 are configured to consolidate particulate on different areas of build platform 104 and are configured to consolidate different portions of particulate simultaneously. The support structure 114 and the binder jet print heads 102 are able to rotate at an increased speed during fabrication of a component because a plurality of binder jet print heads 102 are used to consolidate particulate. In alternative embodiments, the additive manufacturing system 100 includes any number of binder jet print heads 102 including a single binder jet print head 102.

Moreover, in an embodiment, as shown in FIG. 4, the additive manufacturing system 100 may include a computer control system, or controller 136. More specifically, as shown, the controller 136 includes a processor 138, a memory 140, and a user interface 142 including an input device 144 and a display 146. Further, the controller 136 controls operation of the binder jet print head 102 to facilitate directing binder onto the surface of particulate of a build layer to form a layer of the component. For example, the controller 136 controls the amount of binder that is dispensed through each nozzle or jet 108 of the binder jet print heads 102.

In an embodiment, the additive manufacturing system 100 may be operated to fabricate a component from a computer modeled representation of the 3D geometry of the component. The computer modeled representation may be produced in a computer aided design (CAD) or similar file. The CAD file of the component is converted into a format that includes a plurality of build parameters for one or more helical layers of the component. For example, a build layer of the component includes a particulate to be consolidated (or a particulate slurry) by the additive manufacturing system 100. In an embodiment, the component is modeled in a desired orientation relative to the origin of the coordinate system used in the additive manufacturing system 100. The geometry of the component is sliced into one or more helical layers. Ink jet firing sequences are generated across the geometry of a respective layer. The build parameters are applied for each firing sequence to fabricate that layer of the component from particulate. Once the process is completed, an electronic computer build file (or files) is generated, including all of the layers. The build file is loaded into the controller 136 of the additive manufacturing system 100 to control the system during fabrication of each layer.

After the build file is loaded into the controller 136, the additive manufacturing system 100 is operated to generate the component by implementing the additive manufacturing process, such as a binder jet printing method. The exemplary additive manufacturing process does not use a pre-existing article as the precursor to the final component, rather the process produces components from a raw material in a configurable form, such as particulate. For example, and without limitation, a mold can be additively manufactured using sand that is consolidated using a binder. The additive manufacturing system 100 enables fabrication of components using a broad range of materials, for example, and without limitation, metals, ceramics, glass, and polymers.

Moreover, in an embodiment, during operation of the additive manufacturing system 100, the controller 136 is able to control the position of support structure 114 (or the support beam 121) to adjust the height of binder jet print head 102. For example, FIG. 1 shows support structure 114 in an initial position with the binder jet print head 102 positioned adjacent the build platform 104. FIG. 3 shows the support structure 114 in an elevated position with the binder jet print head 102 located a distance from the build platform 104. In an embodiment, the support structure 114 is moved vertically by adjusting the positions or lengths of legs 122 using the actuator system 126. In alternative embodiments, the support structure 114 is moved in any manner that enables the additive manufacturing system 100 to operate as described herein. In an alterative embodiment, FIG. 2 shows the support beam 121 in an elevated position.

In some embodiments, the controller 136 controls the rotational speed and/or vertical movement speed of the binder jet print heads 102, the particulate dispensers 112, and/or the recoater blades 132 based on operating parameters of the additive manufacturing system 100. Operating parameters of the additive manufacturing system 100 include, for example and without limitation, the configuration of the particulate dispensers 112, the configuration of recoater assembly 110, number and types of the binder jet print heads 102, and size of the build platform 104.

In addition, in an embodiment, the controller 136 coordinates the rotational speeds of the binder jet print heads 102, the recoater blades 132, and/or the particulate dispensers 112 to accommodate local variations in build time requirements. For example, the controller 136 determines layers or sections of layers that require more or less build time due to variations in the thickness of angular sectors of the component and the controller 136 adjusts the rotation rate of the binder jet print heads 102, the recoater blades 132, and/or the particulate dispensers 112 to maintain the sections within the build area for the required time for the binder jet print head 102 to complete consolidation of each section.

Also, in an embodiment, as shown in FIGS. 1 and 3, the additive manufacturing system 100 may include a cleaning assembly 148 positionable adjacent each binder jet print head 102 and configured to clean the binder jet print head 102. For example, the cleaning assembly 148 is coupled to arm 116 and is able to clean the binder jet print head 102 without requiring disassembly of the additive manufacturing system 100.

Figure 5:
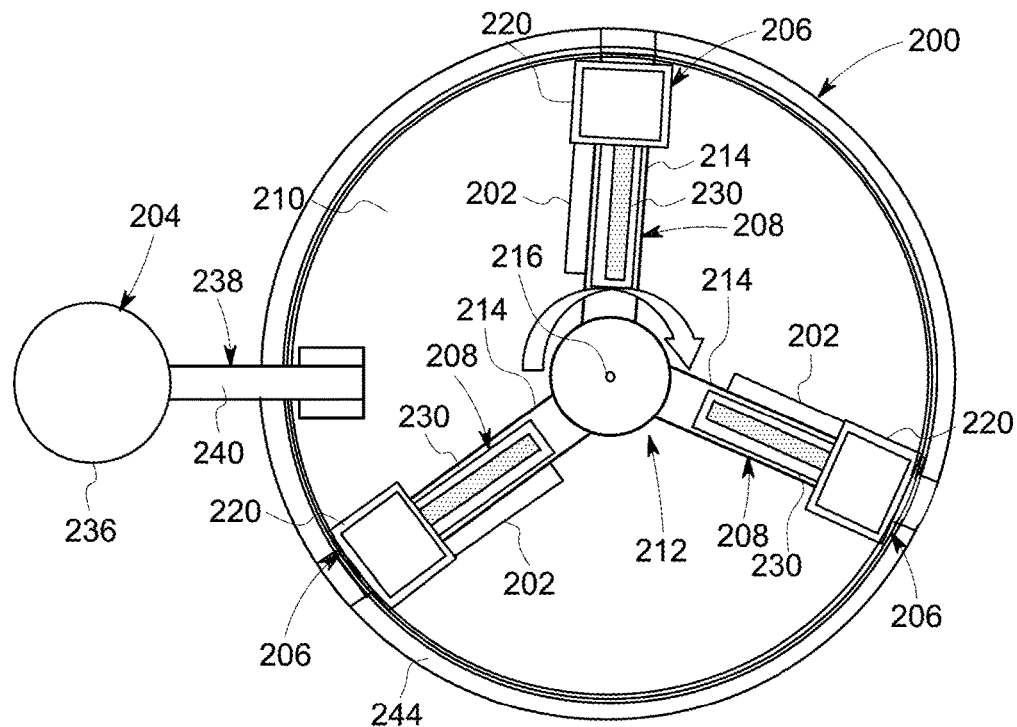
FIG. 5 illustrates a schematic plan view of an embodiment of an additive manufacturing system including at least one rotating binder jet print head and a feed system according to the present disclosure.

Referring now to FIG. 5, a schematic plan view of another embodiment of an additive manufacturing system 200 according to the present disclosure is illustrated. As shown, the additive manufacturing system 200 includes at least one rotating binder jet print head 202 and a feed system 204. Further, the additive manufacturing system 200 includes binder jet print heads 202, a feed system 204, at least one particulate dispenser 206, at least one recoater assembly 208, a build platform 210, and a support structure 212. The support structure 212 includes a plurality of arms 214 that support binder jet print heads 202, particulate dispensers 206, and recoater assemblies 208. Binder jet print heads 202, particulate dispensers 206, and recoater assemblies 208 rotate relative to build platform 210 about a rotation axis 216 extending through the build platform 210.

Figure 6:
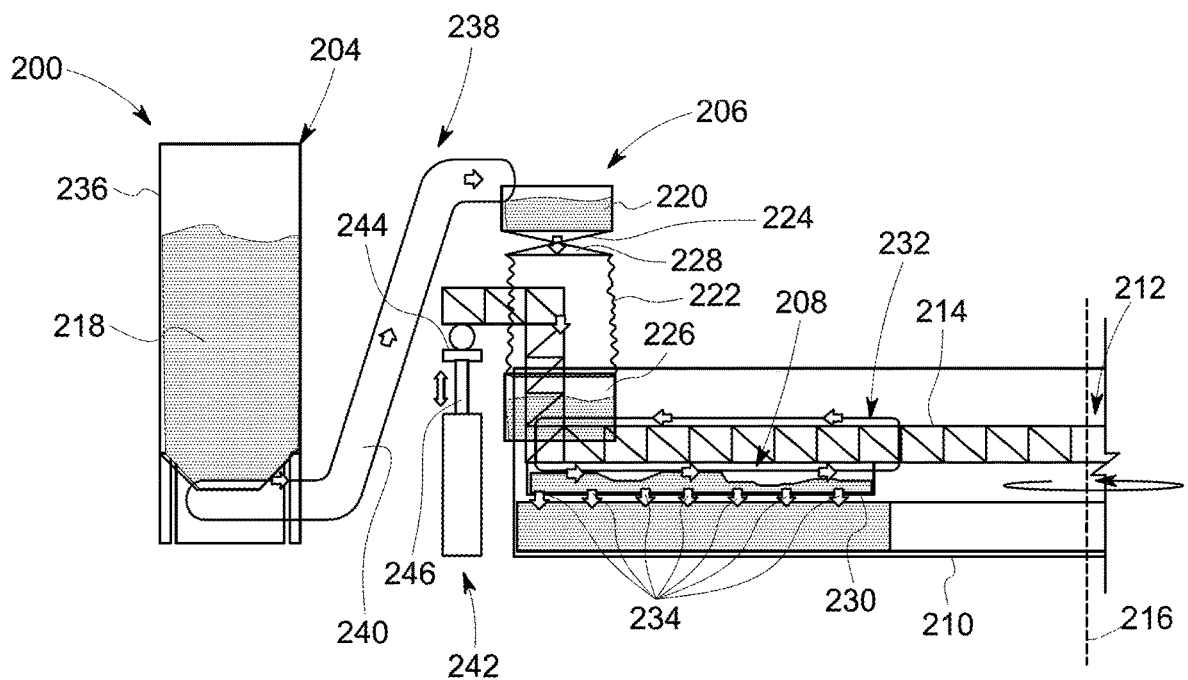
FIG. 6 illustrates a schematic side view of the additive manufacturing system shown in FIG. 5.

Referring now to FIG. 6, a schematic side view of one embodiment of the additive manufacturing system 200 of FIG. 5 is illustrated. During operation of the additive manufacturing system 200, particulate dispensers 206 deposit particulate 218 on the build platform 210 and recoater assemblies 208 spread particulate 218 evenly over the build platform 210 as particulate dispensers 206 and recoater assemblies 208 rotate relative to build platform 210. The recoater assemblies 208 are configured to control the height of particulate 218 relative to the height of the previous revolution of the helix and facilitate removal of excess particulate 218. The binder jet print heads 202 selectively consolidate particulate 218 to form a cross-sectional layer of a component. During selective consolidation of the layer of particulate 218, arms 214 of support structure 212 are raised to elevate binder jet print heads 202, recoater assemblies 208, and particulate dispensers 206 as particulate 218 is spread over build platform 210 and the partial component to allow continuous consolidation of particulate 218 by binder jet print heads 202. The process is continued until the component is completely built up from the consolidated portion of particulate 218.

In addition, in an embodiment, each particulate dispenser 206 may include an upper hopper or reservoir 220, a conduit 222 coupled to an outlet 224 of upper hopper 220, a lower hopper or reservoir 226 coupled to conduit 222, and a valve 228 configured to regulate flow of the particulate from upper hopper 220 and through conduit 222 to lower hopper 226. In an embodiment, the upper hopper 220 and the conduit 222 are positioned above the lower hopper 226 and particulate is gravity fed to the lower hopper 226. In some embodiments, a sensor (not shown) such as a weight scale or proximity switch provides feedback for use in controlling particulate dispenser 206. For example, the particulate dispenser 206 may be controlled to provide appropriate feed rates of particulate 218 to the build platform 210 and regulate the amount of particulate 218 on the build platform 210.

In addition, in an embodiment, each particulate dispenser 206 may include a trough or conduit 230 extending along the respective arm 214 and a conveyor apparatus 232 configured to convey particulate 218 through trough 230. Each trough 230 is in flow communication with and receives particulate from the respective lower hopper 226 of particulate dispenser 206. Conveyor apparatus 232 includes, for example and without limitation, a belt conveyor, an auger, and/or any other conveyor apparatus. Conveyor apparatus 232 carries particulate 218 along a length of trough 230 so that particulate 218 is dispensed in a desired manner. For example, in some embodiments, additional particulate 218 is dispensed at locations spaced from the center of build platform 210 because of the greater relative rotational speed of particulate dispenser 206 at distances spaced from the axis of rotation. Trough 230 includes a plurality of outlets 234 for particulate 218 to exit trough 230 as conveyor apparatus 232 carries particulate 218 along trough 230. Conveyor apparatus 232 also carries excess particulate 218, i.e., particulate that is not dispensed through outlets 234, back along the length of trough 230 towards lower hopper 226. In alternative embodiments, additive manufacturing system 200 includes any particulate dispenser 206 that enables particulate dispenser 206 to operate as described herein.

In an embodiment, feed system 204 is configured to deliver particulate to each particulate dispenser 206. Feed system 204 includes a supply reservoir 236 and a particulate transfer assembly 238 that is configured to transfer particulate from supply reservoir 236 to each particulate dispenser 206. For example, transfer assembly 238 includes a lift or conveyor apparatus 240 to carry particulate 218 to upper hopper 220. In an embodiment, feed system 204 is stationary relative to build platform 210. Accordingly, the feed system 204 is positioned to align with each particulate dispenser 206 at a specific angular position along the rotational path of particulate dispensers 206. In some embodiments, particulate dispenser 206 pauses or stops at the designated rotational location to receive particulate 218. In further embodiments, feed system 204 delivers particulate 218 to particulate dispenser 206 as particulate dispenser 206 rotates. In alternative embodiments, additive manufacturing system 200 includes any feed system 204 that enables additive manufacturing system 200 to operate as described herein. For example, in some embodiments such as the embodiment shown in FIG. 15, particulate dispenser 206 may be positioned at the center of support structure 212 rather than at the outer circumference of support structure 212.

Also, in an embodiment, the additive manufacturing system 200 includes an actuator system 242 configured to rotate support structure 212 about rotation axis 216 and raise support structure 212 in a direction perpendicular to build platform 210. For example, actuator system 242 includes a rotary actuator (not shown) configured to rotate support structure 212 on a track 244. In addition, in an embodiment, actuator system 242 includes a vertical actuator 246 configured to raise track 244, and therefore support structure 212 positioned on track 244, relative to build platform 210. Vertical actuator 246 includes a hydraulic actuator or any other actuator that enables actuator system 242 to function as described herein. In alternative embodiments, the additive manufacturing system 200 includes any actuator system 242 that enables the additive manufacturing system 200 to operate as described herein.

Figure 15:
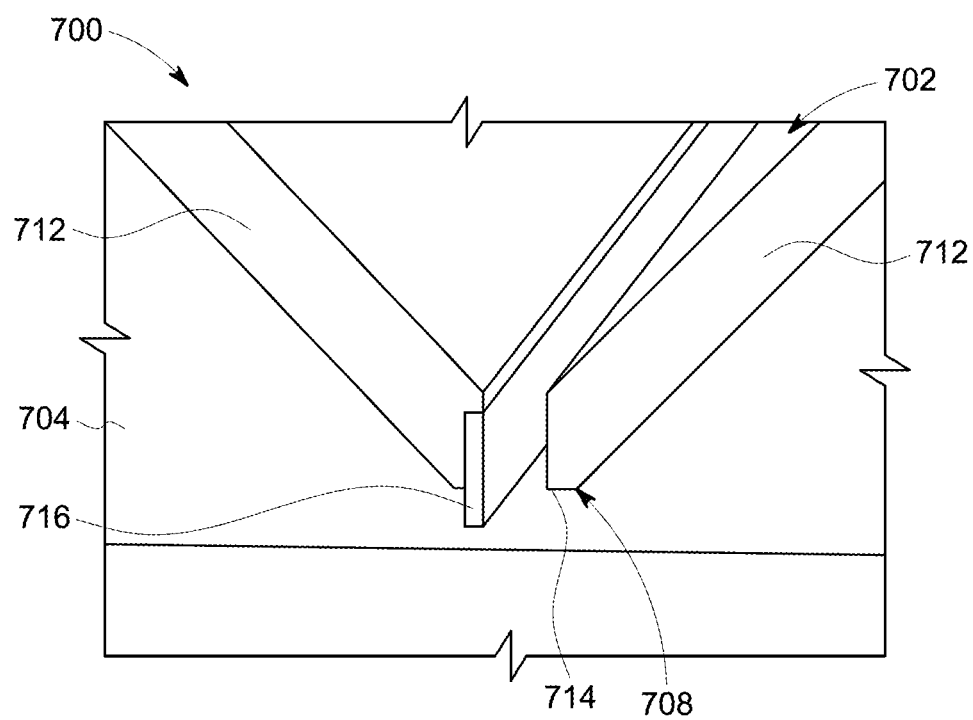
FIG. 15 illustrates an enlarged perspective view of a portion of the recoater assembly shown in FIG. 14.
Figure 16:
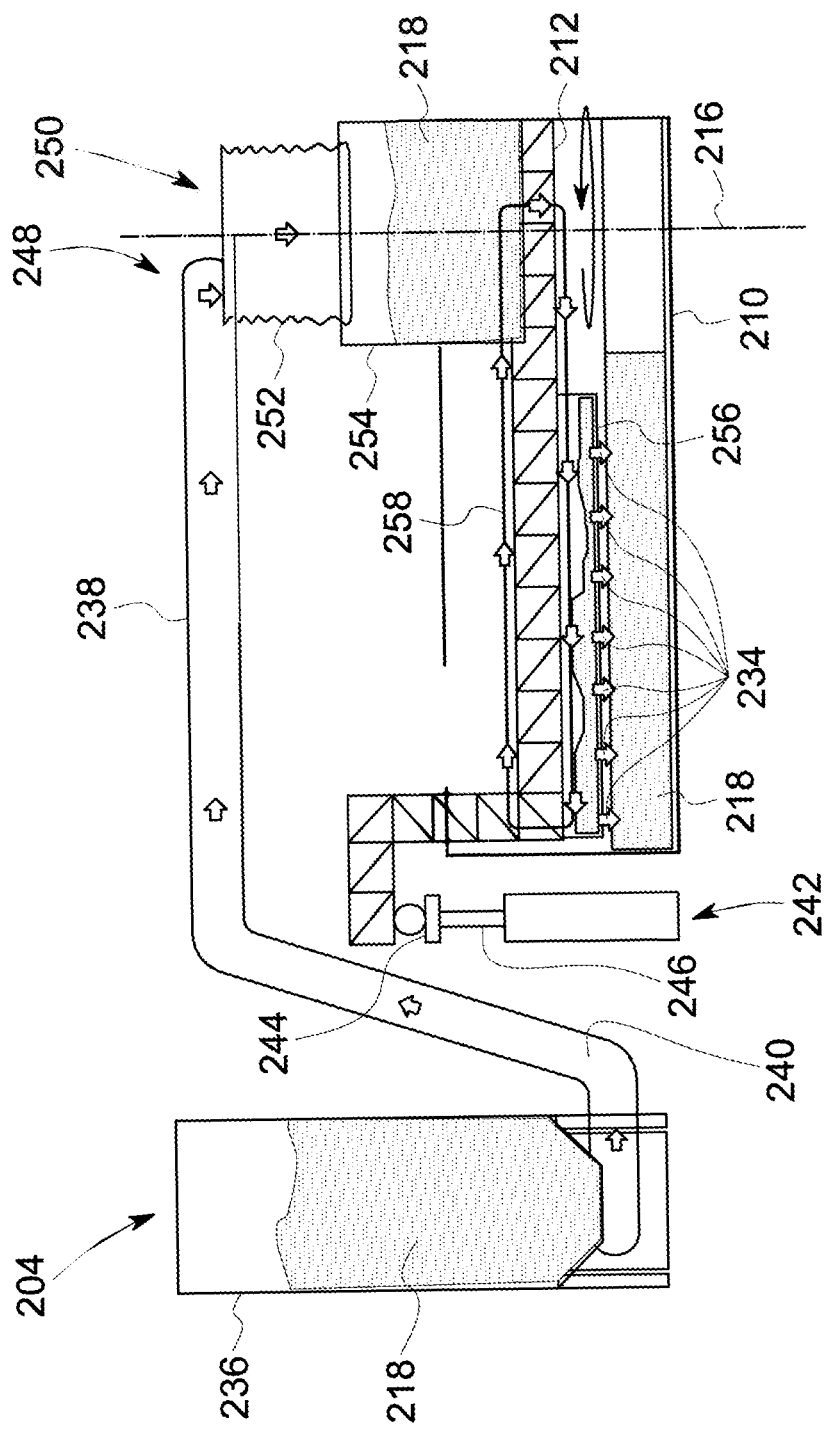
FIG. 16 illustrates a schematic side view of an additive manufacturing system including a rotating feed system.

Referring now to FIG. 15, a schematic side view of another embodiment of an additive manufacturing system 248 according to the present disclosure is illustrated. For example, as shown, the additive manufacturing system 248 is similar to the additive manufacturing system 200 (shown in FIGS. 4 and 5) except additive manufacturing system 248 includes a particulate dispenser 250 positioned in a center of support structure 212 and aligned with a center of build platform 210. In an embodiment, the particulate dispenser 250 is mounted to and rotates with support structure 212.

In addition, in an embodiment, the particulate dispenser 250 includes a conduit 252, a central hopper or reservoir 254 coupled to conduit 252, a trough or conduit 256 extending along each arm 214, and a conveyor apparatus 258 configured to convey particulate 218 through each trough 256. Each trough 256 is in flow communication with and receives particulate from central hopper 254 of particulate dispenser 250. In alternative embodiments, the additive manufacturing system 200 includes any particulate dispenser 206 that enables particulate dispenser 206 to operate as described herein.

In an embodiment, the feed system 204 is configured to deliver particulate 218 to particulate dispenser 250. Specifically, particulate transfer assembly 238 extends from supply reservoir 236 across a radius of build platform 210 to conduit 252 of particulate dispenser 250. Conduit 252 is configured to receive particulate 218 and direct particulate to central hopper 254 as particulate dispenser 250 rotates relative to feed system 204. For example, in some embodiments, conduit 252 includes an inlet for particulate 218 to enter conduit 252 from transfer assembly 238 and an outlet for particulate 218 to be dispensed into central hopper 254. Also, conduit 252 includes a seal or valve such as a bellows seal to prevent leakage of particulate 218 from conduit 252 and/or control particulate flow through dispenser 250. In alternative embodiments, additive manufacturing system 248 includes any feed system 204 that enables the additive manufacturing system 200 to operate as described herein. For example, in some embodiments, supply reservoir 236 is positioned at a center of build platform 210.

Figure 7:
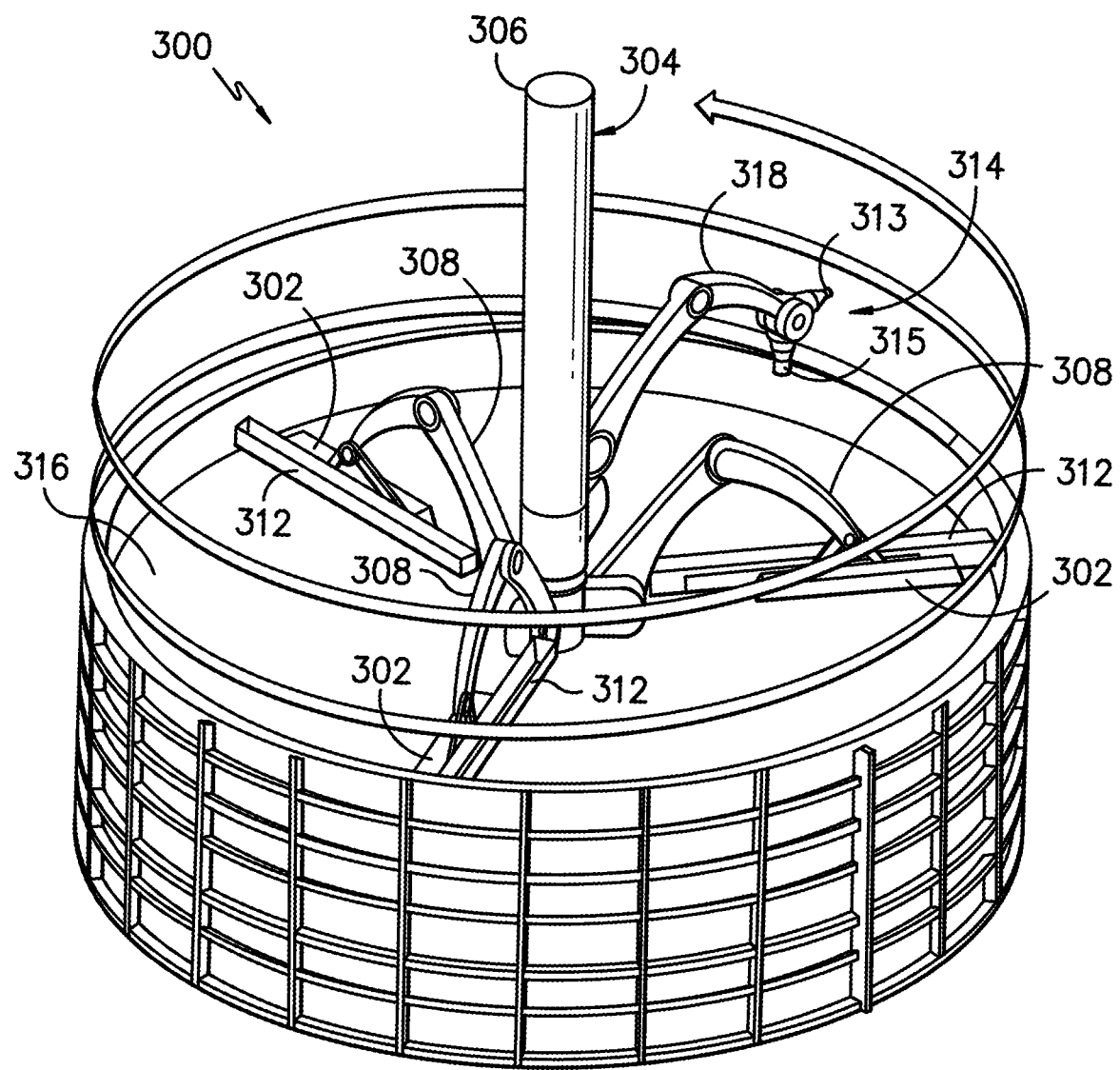
FIG. 7 illustrates a perspective view of an embodiment of an additive manufacturing system including a rotating binder jet print head and a plurality of articulated arms according to the present disclosure.

Referring now to FIG. 7, a perspective view of an embodiment of an additive manufacturing system 300 including at least one rotating first nozzle, e.g. binder jet print head 302, and a plurality of articulated arms is illustrated. As shown, the additive manufacturing system 300 includes a support structure 304 including a central support 306 and a plurality of first articulated arms 308 extending at least partly radially outward from central support 306. The binder jet print heads 302 and recoater assemblies 312 are coupled to ends of first articulated arms 308. The first articulated arms 308 are positionable to adjust the location of binder jet print heads 302 and recoater assemblies 312 relative to a build platform 316. In addition, the first articulated arms 308 may be rotatably coupled to central support 306 such that the binder jet print heads 302 and recoater assemblies 312 are rotatable relative to build platform 316. The recoater assemblies 312 are coupled to the first articulated arms 308 adjacent binder jet print heads 302 such that recoater assemblies 312 spread particulate in front of binder jet print heads 302 as first articulated arms 308 rotate relative to build platform 316 about central support 306.

Figure 8:
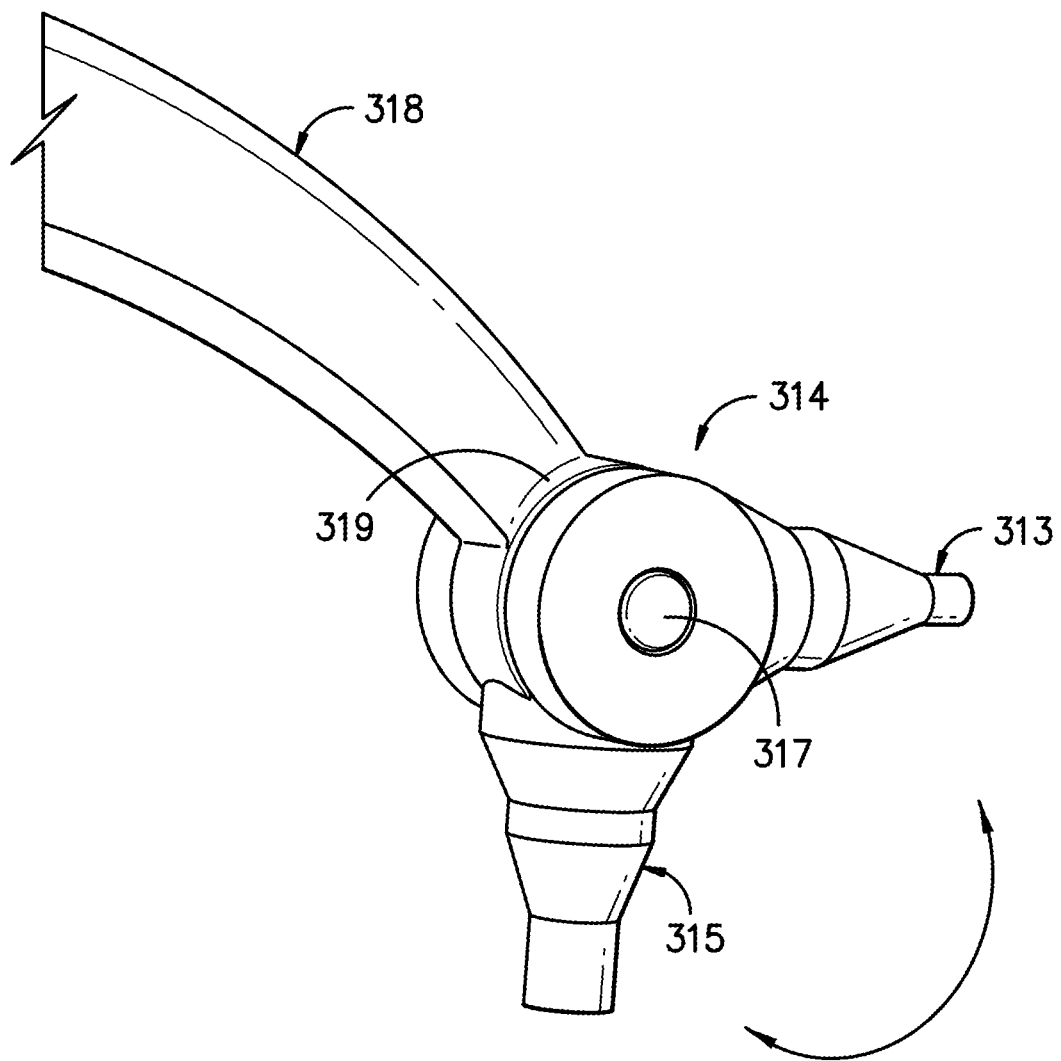
FIG. 8 illustrates a detailed, perspective view of an embodiment of particulate dispenser assembly of an additive manufacturing system according to the present disclosure.

Also, in an embodiment, the additive manufacturing system 300 may include at least one particulate dispenser assembly 314. In particular, as shown in FIGS. 7 and 8, the particulate dispenser assembly 314 may optionally include a bulk dispenser 313 and/or a vacuum nozzle 315. Further, as shown, the particulate dispenser assembly 314 may be coupled to a second articulated arm 318 that allows positioning of the particulate dispenser assembly 314 relative to the build platform 316. As such, the particulate dispenser assembly 314 is able to move radially relative to build platform by the positioning second articulated arm 318. Thus, in such embodiments, the bulk dispenser 313 may be configured to dispense particulate material in bulk therethrough, whereas the vacuum nozzle 315 is configured to remove particulate to and from the build platform. In such embodiments, the bulk dispenser 313 and the vacuum nozzle 315 may also be mounted to an end 319 of the second arm 318 at a hinge point 317. Accordingly, as shown in FIG. 8, the bulk dispenser 313 and the vacuum nozzle 315 may be rotatable about the hinge point 317. Moreover, in an embodiment, the bulk dispenser 313 and the vacuum nozzle 315 may be spaced about by at least about 90 degrees as well as any other suitable angle to allow for the nozzle to operate as desired.

In some embodiments, the bulk dispenser 313 can be fixed as the binder jet print heads 302 and the recoater assemblies 312 rotate relative to the build platform 316. Accordingly, particulate dispenser is able to deposit particulate for each recoater assembly 312 to spread across build platform 316 for the binder jet print heads 302 to consolidate. In alternative embodiments, the additive manufacturing system 300 may include any particulate dispenser that enables the additive manufacturing system 300 to operate as described herein. For example, in some embodiments, the additive manufacturing system 300 includes a plurality of particulate dispensers.

Figure 9:
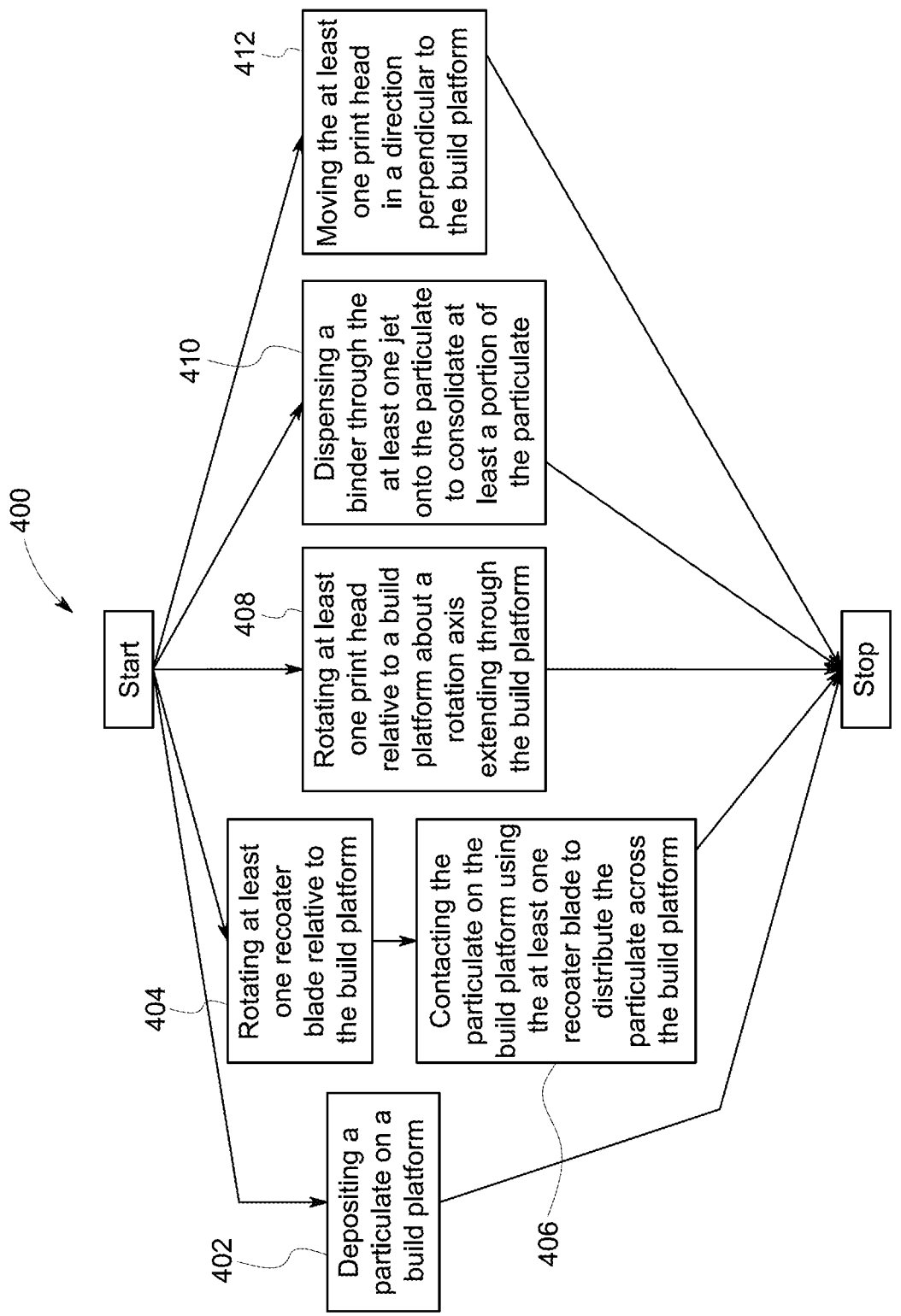
FIG. 9 illustrates a flow chart of an exemplary method of fabricating a component using an additive manufacturing system including a rotating binder jet print head.

Referring now to FIG. 9, a flow chart of an embodiment of a method 400 of fabricating a component using the additive manufacturing system 100 (shown in FIGS. 1-4), the additive manufacturing system 200 (shown in FIGS. 5 and 6), or the additive manufacturing system 300 (shown in FIGS. 7-8) is illustrated. In reference to FIGS. 1-4 and 9, the method 400 includes depositing 402 particulate on build platform 104. For example, particulate is deposited on build platform 104 using particulate dispenser 112. Particulate dispenser 112 is rotated relative to build platform 104 and deposits particulate in front of recoater blade 132 and binder jet print heads 102 relative to the direction of rotation of particulate dispenser 112. In some embodiments, particulate dispenser 112 receives particulate from feed system 204 (shown in FIGS. 5 and 6). In alternative embodiments, particulate is deposited on build platform 104 in any manner that enables the additive manufacturing system 100 to operate as described herein.

In addition, the method 400 includes rotating 404 at least one recoater blade 132 relative to build platform 104 and contacting 406 particulate on build platform 104 using at least one recoater blade 132 to distribute particulate across build platform 104. Also, the method 400 includes rotating 408 at least one binder jet print head 102 relative to build platform 104 about rotation axis 124 extending through build platform 104. For example, in some embodiments, arms 116 supporting binder jet prints head 102 and recoater blades 132 are rotated about rotation axis 124 using actuator system 126. In alternative embodiments, recoater blades 132 and/or recoater blades 132 are rotated in any manner that enables the additive manufacturing system 100 to operate as described herein.

Also, the method 400 includes dispensing 410 a binder through jet 108 onto particulate to consolidate at least a portion of particulate. In some embodiments, the particulate described herein may include sand and the binder may be configured to bind the sand together to form a component such as a portion of a mold. In further embodiments, the particulate may also include a slurry. For example, in an embodiment, the particular may include sand that is pre-impregnated with a catalyst, a ceramic slurry, or any suitable combinations.

Moreover, the method 400 includes moving 412 at least one binder jet print head 102 in a direction perpendicular to build platform 104. For example, support structure 114 supports binder jet print heads 102, recoater blades 132, and particulate dispensers 112 and is rotated and raised by actuator system 126 during operation of the additive manufacturing system 100.

In some embodiments, the build platform 104 is rotated relative to binder jet print head 102 and/or moved in the build direction during fabrication of the component. For example, in some embodiments, build platform 104 is rotated relative to binder jet print heads 102. In further embodiments, build platform 104 is lowered as binder jet print heads 102 or build platform 104 is rotated.

In an embodiment, the method 400 allows binder jet print heads 102 and recoater blades 132 to operate simultaneously and provide a helical build process in which a component is fabricated using a plurality of helical build layers. As a result, the time required to fabricate components using the additive manufacturing system 100 (shown in FIGS. 1-4), the additive manufacturing system 200 (shown in FIGS. 5 and 6), and/or the additive manufacturing system 300 (shown in FIG. 7) is reduced.

Figure 10:
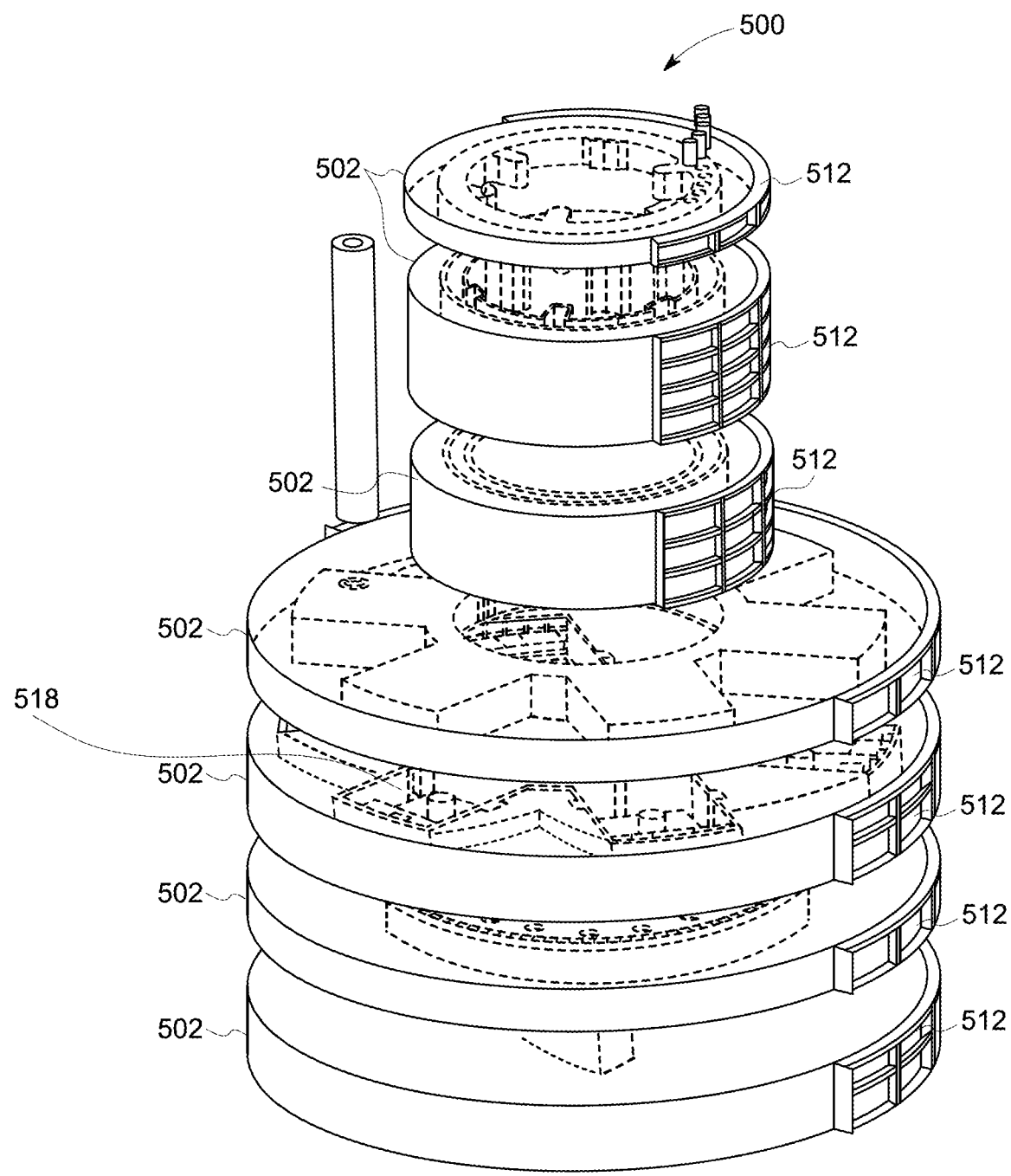
FIG. 10 illustrates a schematic perspective view of a mold assembled from mold portions fabricated using an additive manufacturing system including a rotating binder jet print head.

Referring now to FIG. 10, a schematic perspective view of an embodiment of a mold 500 assembled from components fabricated using the additive manufacturing system 100 (shown in FIGS. 1-4), the additive manufacturing system 200 (shown in FIGS. 5 and 6), and/or the additive manufacturing system 300 (shown in FIGS. 7 and 8) according to the present disclosure is illustrated. For example, as shown, the additive manufacturing system 100, 200, 300 is used to fabricate a plurality of mold portions or layers 502 which are assembled into mold 500. In an embodiment, mold 500 is a sand mold and each mold portion 502 is formed from sand. As a result, mold 500 may have an increased size and a reduced cost in comparison to molds formed from other materials.

Figure 11:
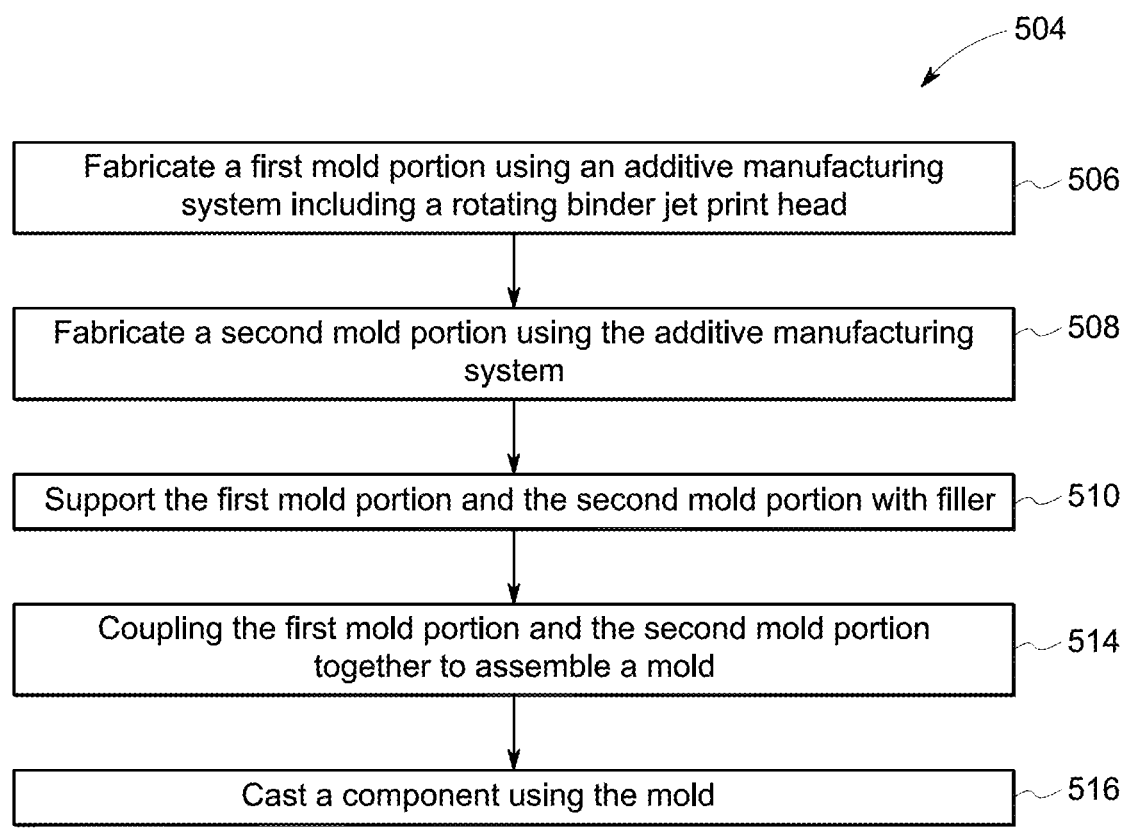
FIG. 11 illustrates a flow chart of an exemplary method of casting a component using the mold shown in FIG. 10.

Referring now to FIG. 11, a flow chart of one embodiment of a method 504 of casting a component using the mold 500 (shown in FIG. 9) is illustrated. In reference to FIGS. 1, 5, 7, 10, and 11, the method 504 may include fabricating 506 first mold portion 502 using the additive manufacturing system 100, 200, 300 including rotating binder jet print heads 102, 202, 302 and fabricating 508 second mold portion 502 using the additive manufacturing system 100, 200, 300 including rotating binder jet print heads 102, 202, 302.

Also, the method 504 includes supporting 510 first mold portion 502 and second mold portion 502 with filler, such as sand. In some embodiments, unconsolidated particulate 218 (shown in FIG. 6) can be removed and filler sand, which may be less expensive than particulate 218, can be positioned around the mold portions 502. In addition, in some embodiments, each mold portion 502 may also be surrounded by a cask or flask 512. Also, in some embodiments, one or more chills (not shown) may be positioned on, adjacent, and/or in mold portions 502 to control the solidification of a component formed using mold 500. Further discussion of the chills are provide herein below. In further embodiments, a coating may also be applied to at least a portion of the mold portions 502, which is also discussed in more detail herein below. In alternative embodiments, the mold portions 502 may be supported and treated in any manner that enables the mold 500 to function as described herein.

In addition, the method 504 includes coupling 514 first mold portion 502 and second mold portion 502 together to assemble mold 500. In an embodiment, mold portions 502 may be stacked in a vertical arrangement. In alternative embodiments, the mold portions 502 may be assembled in any manner that enables mold 500 to function as described herein. Also, the method 504 optionally includes repeating any of steps 508, 510, and 514 for any number of iterations to assemble mold 500 from any number of mold portions 502. Moreover, the method 504 may include casting 516 a component 518 using the mold 500. For example, in some embodiments, cavities in the mold 500 may be filled with one or more precursor materials in liquid form and the materials are solidified to form component 518.

Figure 12:
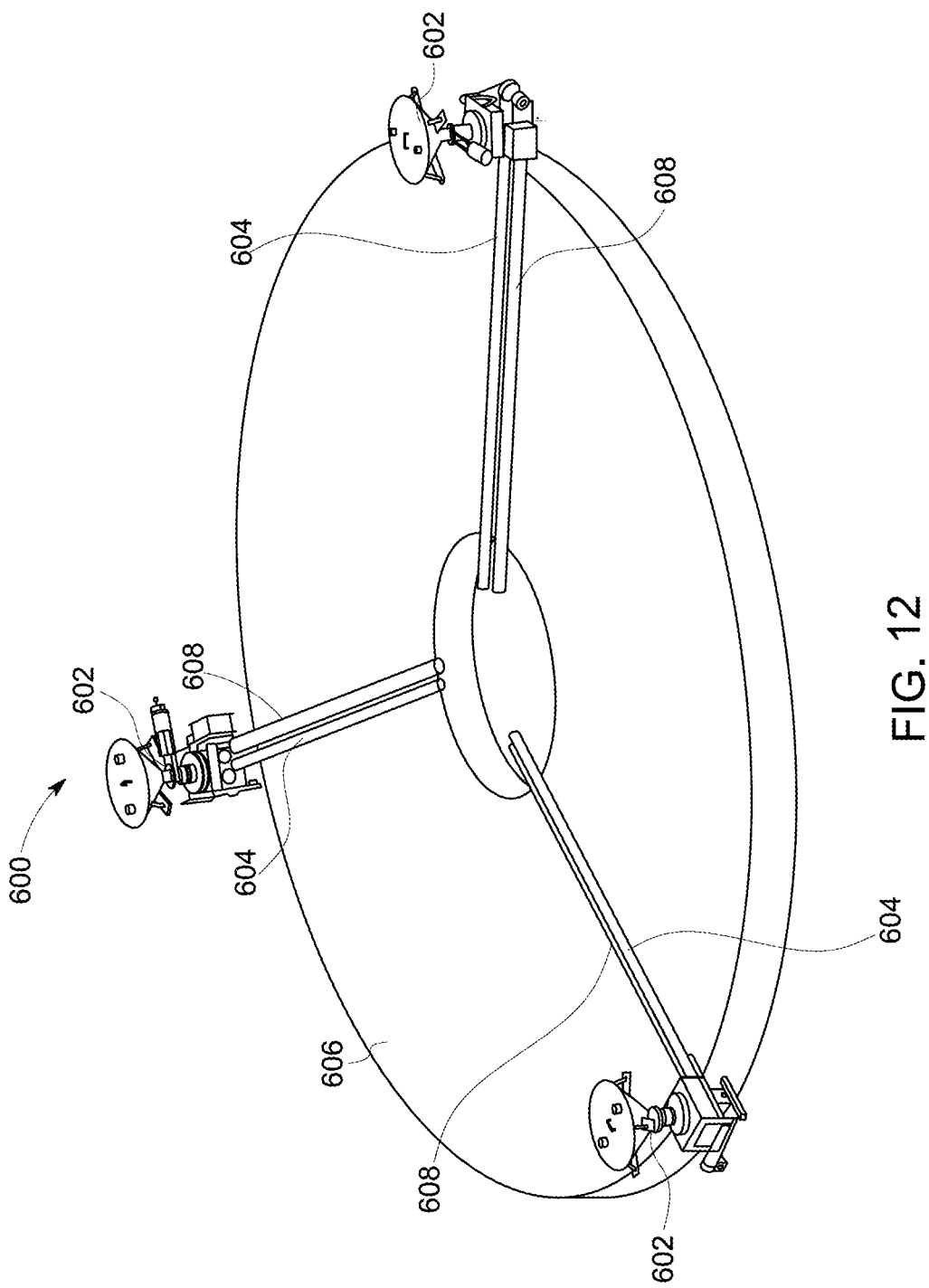
FIG. 12 illustrates a perspective view of an exemplary embodiment of a particulate feed and dispenser system for an additive manufacturing system including a rotating binder jet print head.

Referring now to FIG. 12, a perspective view of one embodiment of a particulate feed and dispenser system 600 according to the present disclosure is illustrated. As shown, the particulate feed and dispenser system 600 may be used with the additive manufacturing system 100 (shown in FIGS. 1-3), the additive manufacturing system 200 (shown in FIGS. 4 and 5), and/or the additive manufacturing system 300 (shown in FIGS. 7 and 8). In alternative embodiments, the feed and dispenser system 600 may be used with any additive manufacturing system that enables feed and dispenser system 600 to function as described herein.

In an embodiment, the feed and dispenser system 600 includes a plurality of feed assemblies 602 and a plurality of dispenser assemblies 604. Each dispenser assembly 604 is coupled to and receives particulate from a respective feed assembly 602. In addition, each dispenser assembly 604 extends radially across build platform 606 and is configured to dispense particulate onto build platform 606. In addition, feed and dispenser system 600 includes a recoater assembly 608 coupled to each dispenser assembly 604. Recoater assembly 608 is configured to spread particulate across build platform 606. In some embodiments, at least a portion of feed and dispenser system 600 is configured to rotate relative to build platform 606 as dispenser assemblies 604 dispense particulate and as recoater assemblies 608 spread particulate across build platform 606. In alternative embodiments, feed and dispenser system 600 includes any dispenser assembly 604 and/or recoater assembly 608 that enables particulate feed and dispenser system 600 to operate as described herein.

Figure 13:
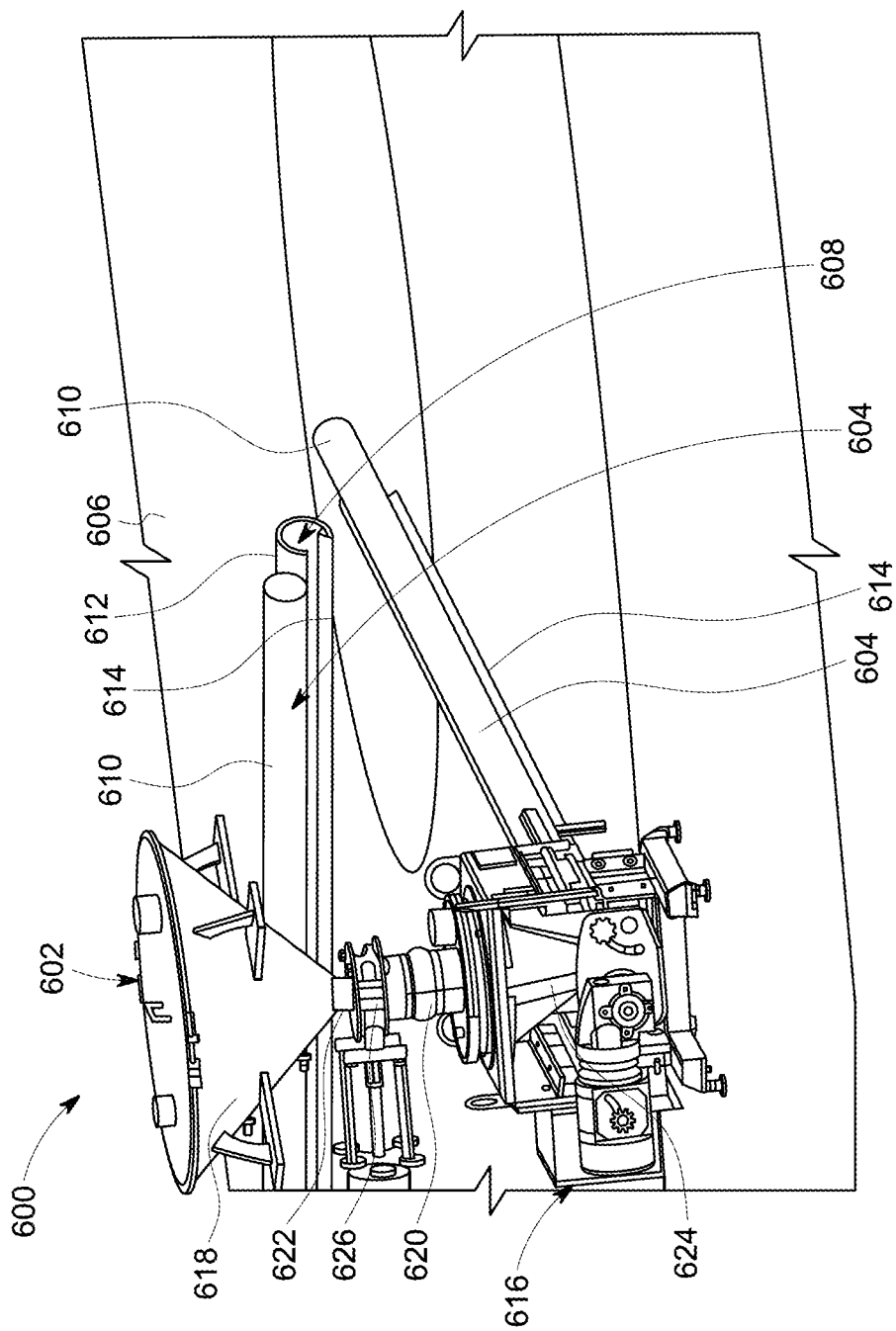
FIG. 13 illustrates an enlarged perspective view of a portion of the particulate feed and dispenser system shown in FIG. 12.

FIG. 13 illustrates an enlarged perspective view of a portion of particulate feed and dispenser system 600. In an embodiment, each dispenser assembly 604 includes a conduit 610 that receives particulate from feed assembly 602 and dispenses the particulate. Recoater assemblies 608 are coupled to conduit 610. Each recoater assembly 608 includes a return conduit 612 and a recoater blade 614 coupled to return conduit 612. Return conduit 612 defines a cavity to receive excess particulate as recoater blade 614 spreads the particulate across build platform 606. A conveyor apparatus 616 is configured to carry particulate through return conduit 612 towards feed assemblies 602. In some embodiments, conveyor apparatus 616 includes an auger (not shown) positioned within return conduit 612 and a motor configured to rotate the auger. In alternative embodiments, feed and dispenser system 600 includes any dispenser assembly 604 that enables feed and dispenser system 600 to operate as described herein.

Also, in an embodiment, each feed assembly 602 includes an upper hopper 618, a conduit 620 coupled to an outlet 622 of upper hopper 618, a lower hopper 624 coupled to conduit 620, and a valve 626 configured to regulate flow of the particulate from upper hopper 618 and through conduit 620 to lower hopper 624. During operation of particulate feed and dispenser system 600, particulate is directed from feed assembly 602 into conduit 610 of dispenser assembly 604 and particulate is dispensed through outlets onto build platform 606. In some embodiments, conveyor apparatus 616 or a separate conveyor apparatus (not shown in FIG. 13) is configured to direct particulate through conduit 610. For example, an auger may be positioned in conduit 610 to direct and dispense particulate along the length of conduit 610. In such embodiments, the distal end of conduit 610 is at least partially open to allow particulate to exit conduit 610. In some embodiments, a container or collection device is positioned to collect particulate as particulate exits conduit 610. In alternative embodiments, feed and dispenser system 600 includes any feed assembly 602 that enables feed and dispenser system 600 to operate as described herein.

In addition, in an embodiment, the recoater blade 614 contacts particulate and spreads particulate across build platform 606 in a layer having a desired thickness. Excess particulate is received in conduit 612 and directed towards feed assembly 602 by conveyor apparatus 616.

The articulate feed and dispenser system 600 is configured to provide one or more layers of particulate for consolidation by binder jet print heads 102 (shown in FIGS. 1-4), binder jet print heads 202 (shown in FIGS. 5 and 6), or binder jet print heads 302 (shown in FIGS. 7 and 8). In some embodiments, the particulate feed and dispenser system 600 is rotated relative to build platform 606 in coordination with binder jet print heads 102, 202, 302. In further embodiments, at least a portion of particulate feed and dispenser system 600, such as feed assembly 602, is stationary relative to build platform 606.

Figure 14:
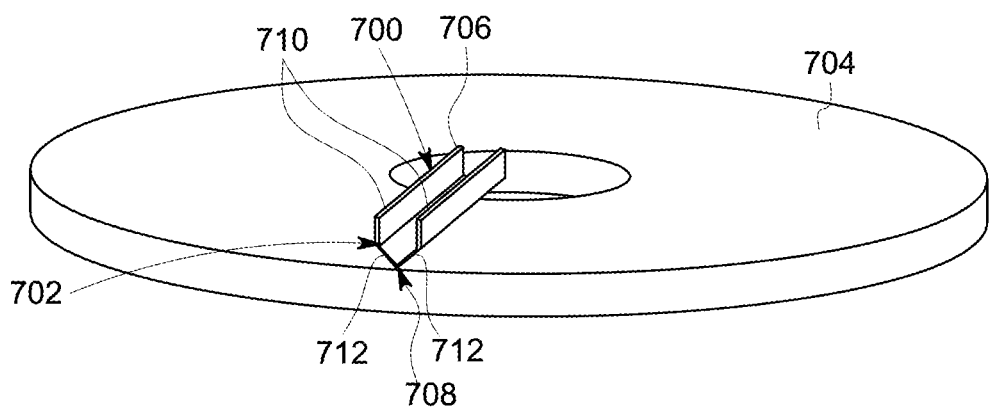
FIG. 14 illustrates a perspective view of an exemplary embodiment of a recoater assembly for an additive manufacturing system including a rotating binder jet print head.

Referring now to FIGS. 12 and 15, various views of a recoater assembly 700 according to the present disclosure are illustrated. In particular, FIG. 14 illustrates a perspective view of a portion of the recoater assembly 700, whereas FIG. 15 illustrates an enlarged perspective view of a portion of the recoater assembly 700. The recoater assembly 700 may be used with the additive manufacturing system 100 (shown in FIGS. 1-3), the additive manufacturing system 200 (shown in FIGS. 4 and 5), and/or the additive manufacturing system 300 (shown in FIGS. 7 and 8). In alternative embodiments, the recoater assembly 700 may be used with any additive manufacturing system that enables recoater assembly 700 to function as described herein.

In an embodiment, the recoater assembly 700 includes a trough 702 extending across a build platform 704. Trough 702 includes a top 706, a bottom 708 opposite top 706, and opposed walls 710 extending between top 706 and bottom 708. The top 706 is substantially open. The bottom 708 includes angled walls 712 forming a funnel shape. The bottom 708 defines an outlet 714 adjacent build platform 704. Particulate received within trough 702 is funneled downward towards outlet 714 and is dispensed from trough 702 through outlet 714. In alternative embodiments, recoater assembly 700 includes any trough 702 that enables recoater assembly 700 to operate as described herein.

In addition, in an embodiment, the outlet 714 is sized to restrict the amount of particulate that flows out of trough 702. For example, a width of the outlet 714 is less than the width of top 706 through which particulate may be received in trough 702. Accordingly, in an embodiment, particulate fills trough 702 as particulate is provided to trough 702 at a greater rate than particulate exits outlet 714. Particulate is provided to and directed through recoater assembly 700 in any manner that enables recoater assembly 700 to operate as described herein. In some embodiments, recoater assembly 700 includes a valve (not shown) to control the flow of particulate provided to trough 702. In further embodiments, recoater assembly 700 includes a conveyor apparatus (not shown in FIGS. 14 and 15) to direct particulate in at least one direction along the length of trough 702.

Also, in an embodiment, a recoater blade 716 is coupled to trough 702 adjacent outlet 714. Recoater blade 716 is configured to spread particulate across build platform 704 as particulate exits trough 702 through outlet 714. Recoater blade 716 is removably coupled to trough 702 to allow removal and replacement of recoater blade 716. In alternative embodiments, recoater assembly 700 includes any recoater blade 716 that enables recoater assembly 700 to operate as described herein.

Referring now to FIGS. 17-25, further embodiments of the additive manufacturing systems described herein are illustrated. In particular, FIGS. 17-25 illustrate additional features of the system that can be included to provide, as an example, variable or different binder density throughout a component, coatings of the component, certain detailed features printed into the component (such as cooling features and/or venting capabilities), as well as structural features.

Figure 17:
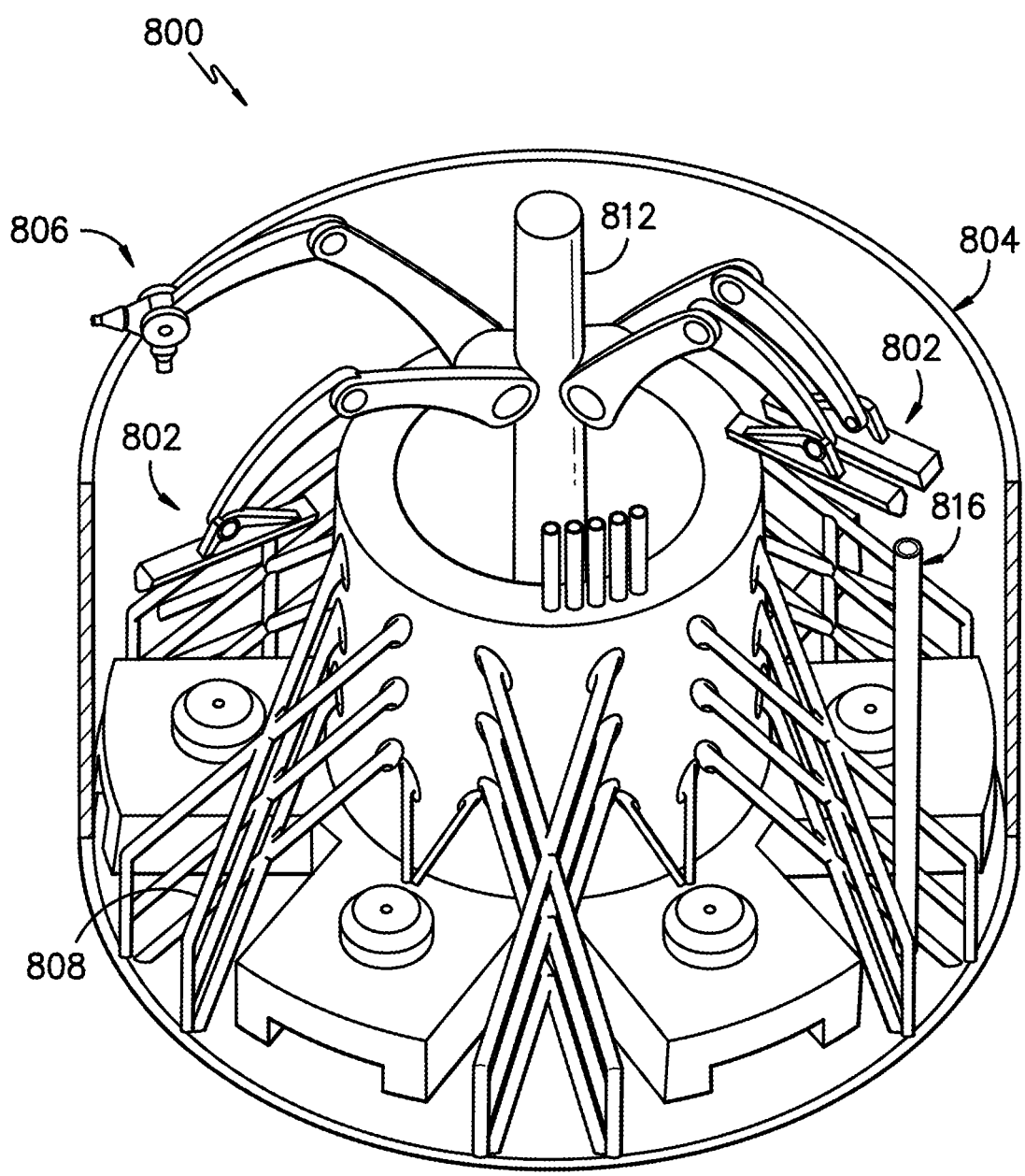
FIG. 17 illustrates a perspective view of another embodiment of an additive manufacturing system including a rotating binder jet print head and a plurality of articulated arms according to the present disclosure.
Figure 18:
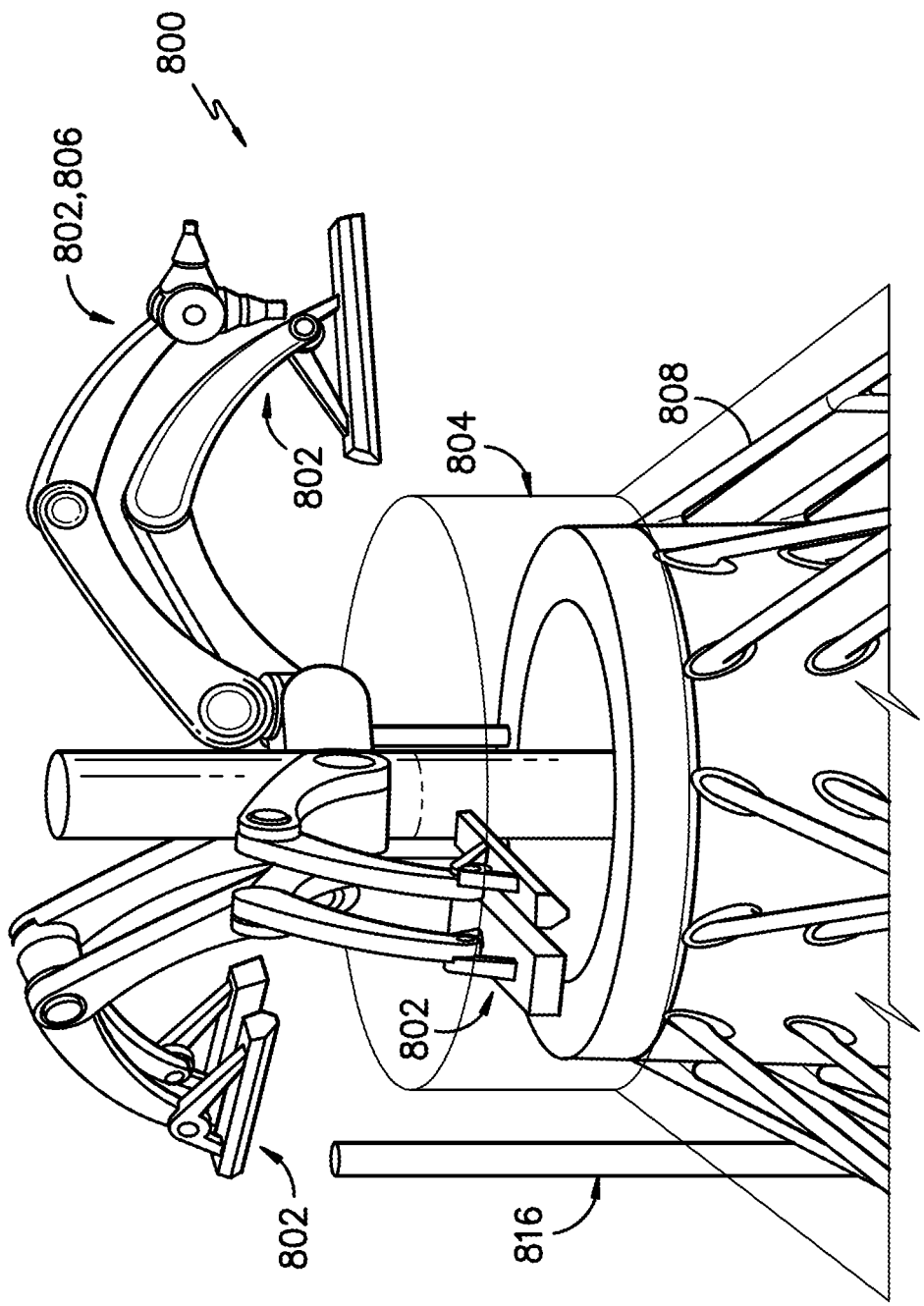
FIG. 18 illustrates a perspective view of yet another embodiment of an additive manufacturing system according to the present disclosure, particularly illustrating the system as it forms a component.

For example, as shown in FIGS. 17 and 18, a perspective view of one embodiment of another embodiment of an additive manufacturing system 800 according to the present disclosure is illustrated. As shown, the additive manufacturing system 800 includes a plurality of print heads 802 capable of dispensing at least one binder, such as a plurality of different binders, in varying densities onto the particulate in multiple locations to consolidate at least a portion of the particulate to form the component having a variable binder density throughout. For example, in an embodiment, the print heads 802 are configured to form a mold 804 that can be used in a casting process as described herein. Accordingly, in certain embodiments, the print heads 802 are capable of ejecting a programmed amount of binder that can vary in density throughout the printed part.

In such embodiments, the varying amount of binder can effectively create a gray-scale of binder rather than black and white. Accordingly, in certain embodiments, the binder density can be varied at multiple locations within the printed part such that, as an example, dense binder can be applied where structural strength is required, whereas sparse binder can be applied where strength is not needed. As such, the cost of the mold 804 can be reduced since the binder is a costly component thereof. Accordingly, the strength, thermal conductivity, and gas permeability may be tailored to specific locations in the mold 804 using this technique. Furthermore, local weak spots may be intentionally incorporated in the mold 804, creating a line of weakness therein that allows for easier breakout of the part after casting.

As an example, in one embodiment, the print heads 802 illustrated in FIGS. 17 and 18 can be configured to operate similar to the system 300 described in FIGS. 7 and 8. In particular, in one embodiment, certain of the print head(s) 802 can be configured to dispense a first binder through respective binder jet(s) onto the particulate to consolidate at least a portion of the particulate to form the component. Accordingly, such print head(s) 802 can be used to form details of the component. Furthermore, other of the print heads 802 may be configured for dispensing a second binder (which can be the same or different from the first binder as needed) for forming other, less detailed portions of the component.

In particular embodiments, for example, at least one of the print heads 102 can be configured for a variety of printing functions to form a variety of useful features into the component (e.g. the mold 804). For example, in certain embodiments, at least one of the print heads 102 can be configured for dispensing the at least one binder onto the particulate to form a support structure 808 for the component, one or more chills 810 in the component, one or more vents 812 in the component, one or more channels 814 in the component, one or more tubes in the component, one or more protrusions, one or more holes, and/or any suitable feature that can be formed using the methods described herein, which can vary based on a desired design of the component.

In certain embodiments, as mentioned, the component may be the mold 804 that can be used to form a casted metal part. Sand casting molds, such as mold 804, are often coated with refractory materials prior to casting the metal to form the final part. Such coatings are needed because the friction and temperature of the molten metal poured into the mold would otherwise destroy the particulate used to form the mold. For conventional systems, these coatings are often sprayed on. For the additive manufacturing system 800 according to the present disclosure, however, one of the print heads 802 described herein can be configured to apply or otherwise form a coating 828 onto to the mold 804 before casting the metal part. In such embodiments, the print heads 102 described herein may be different such that different print heads can be configured to dispense different binders, at least one of which being capable of forming the coating 828. In particular, the materials needed to form the coating 828 may include, as an example, ceramic. One of ordinary skill in the art would appreciate that any additional materials may also be used for forming the coatings described herein.

Moreover, in such embodiments, at least one of the print heads 102 is configured to dispense at least one binder onto the particulate to form a feeding system 816 for receiving a molten metal for forming the casted metal part. In addition, in certain embodiments, as shown particularly in FIGS. 17-23, at least one of the print heads 102 of the additive manufacturing system 800 can form the one or more chills 810, the one or more vents 812, and/or the feeding system 816 (and associated channels 814) as part of or into the mold 804.

Figure 19A:
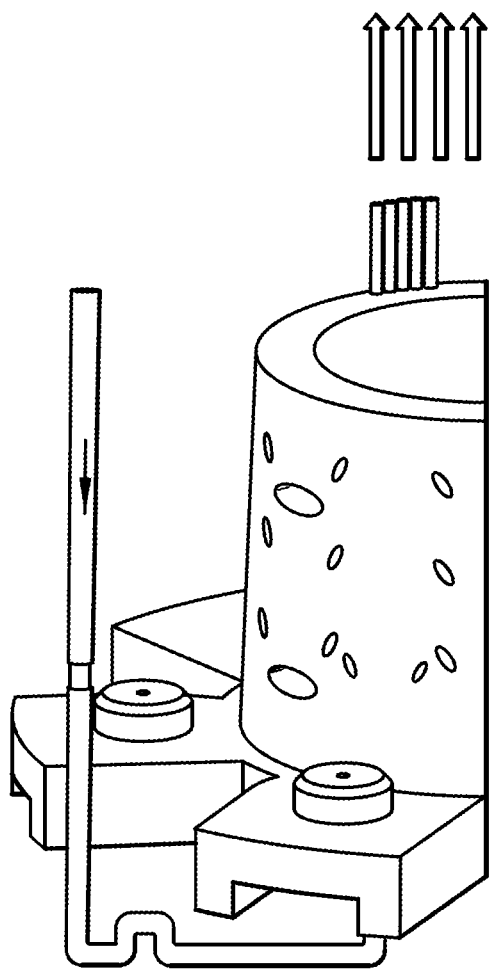
FIGS. 19A-19B illustrate a conventional casting system for forming a component and one embodiment of an additive manufacturing system according to the present disclosure, respectively.
Figure 19B:
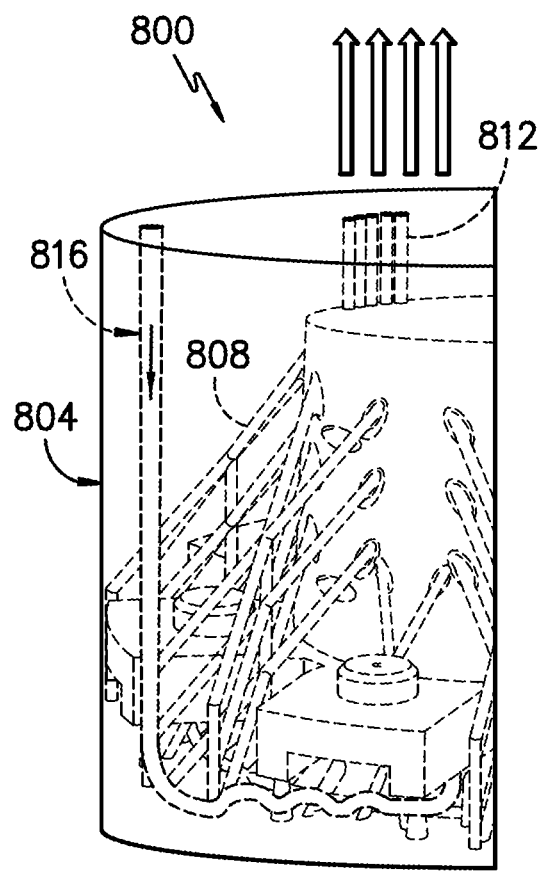
Figure 20:
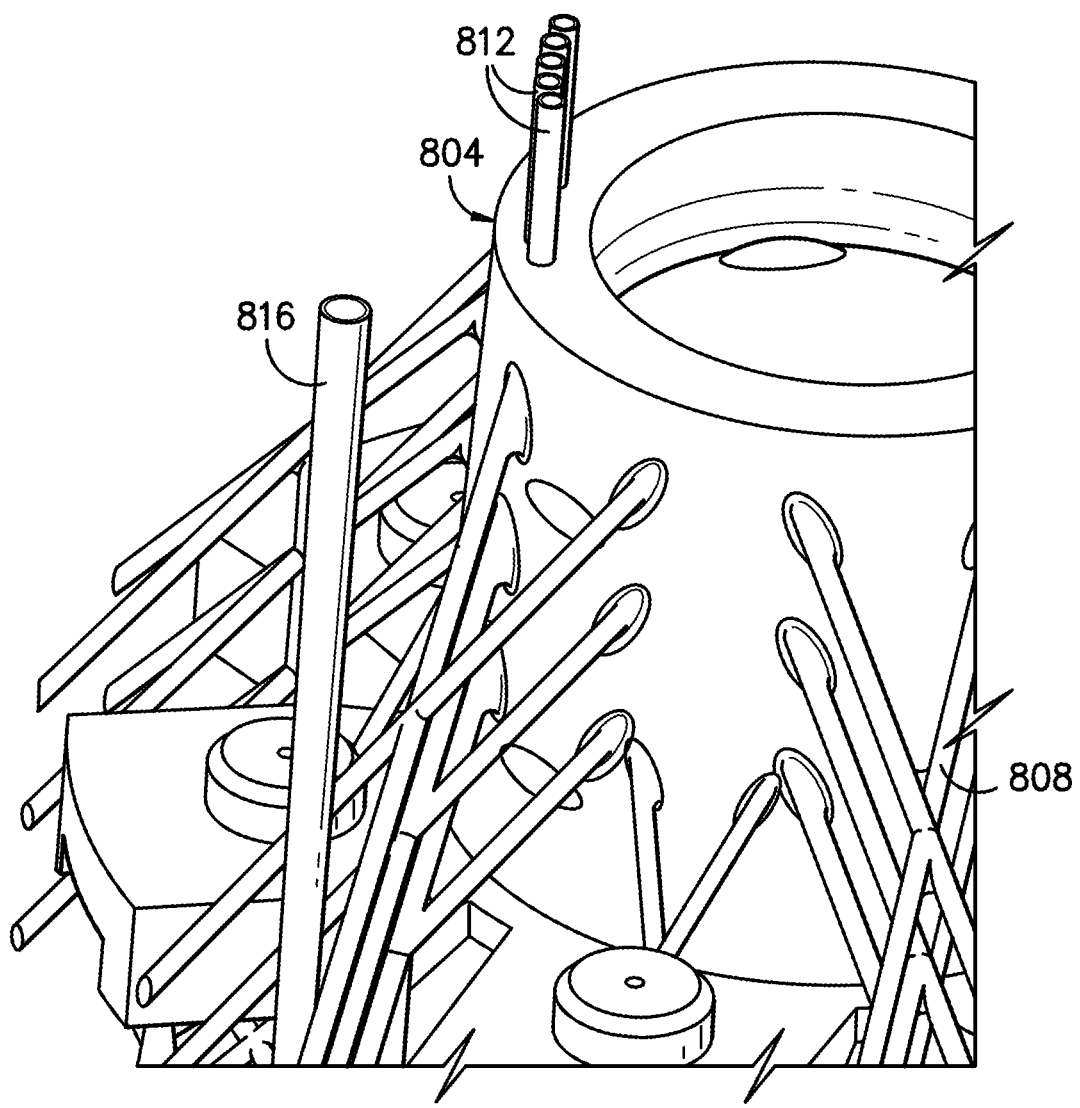
FIG. 20 illustrates a perspective view of an embodiment of a casting mold formed via an additive manufacturing system according to the present disclosure.

Advantages of the present disclosure can be further understood with respect to FIGS. 19A and 19B. In particular, as shown, FIG. 19A illustrates a conventional system for casting a component, whereas FIG. 19B illustrates the additive manufacturing system 800 according to the present disclosure. As shown in FIG. 19A, the conventional system utilizes off-the-shelf ceramic piping for the molten metal feeding system, that include hard turns at the pipe corners. In contrast, as shown in FIG. 19B, the additive manufacturing system 800 according to the present disclosure is capable of printing the mold 804 to include the feeding system 816 for the molten metal, the support structure 808 of the mold, and/or any required vents 812. Thus, certain disadvantages of the conventional system (such as hard turns in the piping) can be eliminated. By printing the mold 804 with the desired features formed therein, the customized shape improves metal flow and speed control, reduces splashes and erosion, and provides numerous other benefits. Moreover, by incorporating such features directly into the mold 804, pre-assembly is eliminated.

In addition, as mentioned, at least one of the print heads 102 can be configured to dispense the binder(s) to form the support structure 808 for the mold 804. Example support structures 808 for the mold 804 are illustrated, at least, in FIGS. 17-20, 22, 24, and 25. More specifically, in an embodiment, the support structure 808 of the mold 804 may have any suitable configuration, such as a lattice configuration as shown throughout the figures. Thus, in such embodiments, the system 800 does not require sand packing to support the printed mold in place. Rather, the additive manufacturing system 800 is configured to print an optimized structure using, at least one of the print heads 102 as an example, that includes a stronger binder material. Accordingly, the stronger binder material is configured to withstand the weight of the mold 804 and the pressures of the casting process.

As mentioned, the additive manufacturing system 800 may also be configured to print one or more three-dimensional chills 810 of various materials, sizes and/or shapes into the component. Conventional chills generally refer to metal or graphite blocks or bricks that are placed in a mold in locations where it is desired to cool the liquid metal more effectively than sand alone. Thus, the liquid metal contacts, either directly or indirectly, the chill(s) and loses heat more quickly in that area. For conventional chills, the desired locations are determined, for example, via modeling.

Figure 21:
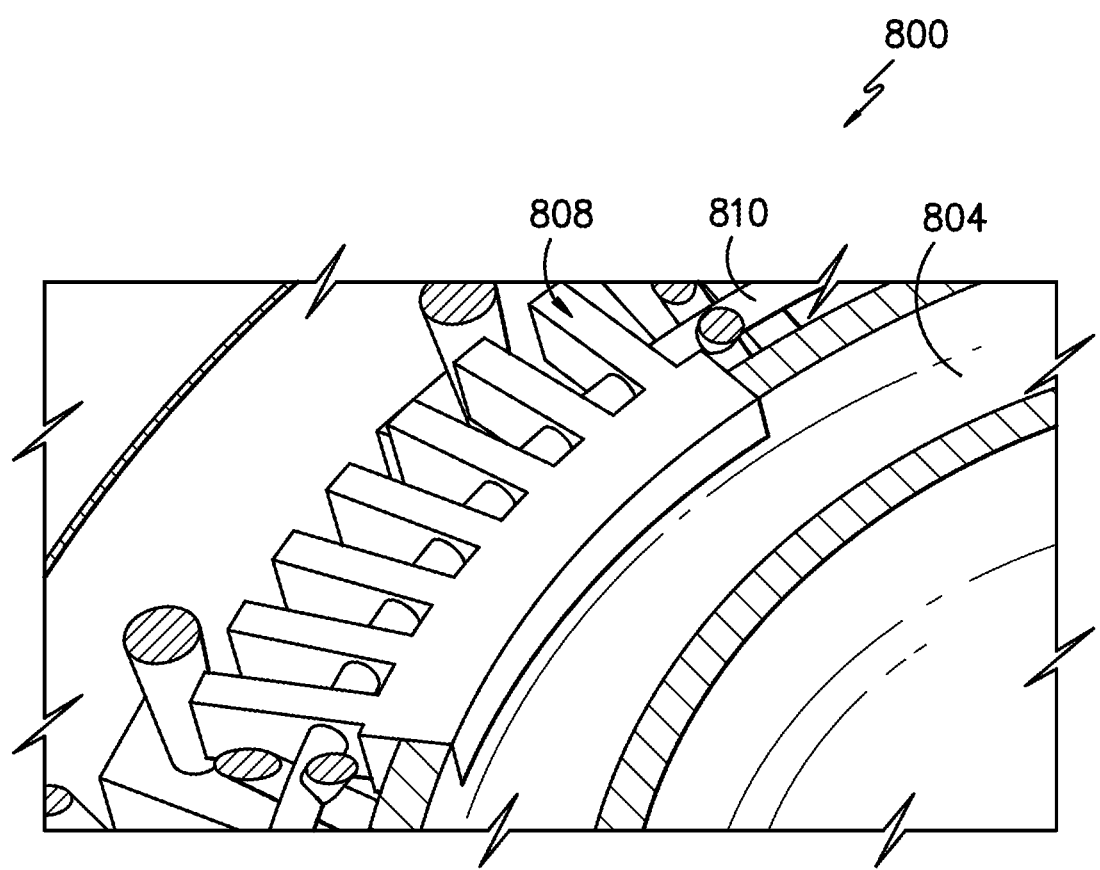
FIG. 21 illustrates a perspective view of an embodiment of a chill printed into a casting mold formed via an additive manufacturing system according to the present disclosure.

In the present disclosure, however, as shown particularly in FIG. 21, the chills can be printed directly into the mold. More specifically, as shown, an example printed chill assembly 810 arranged in the mold 804 is illustrated. Thus, with the additive manufacturing system 800 described herein, the chills 810 can be printed in place to improve cooling efficiency of the casted part. Furthermore, in certain embodiments, the chills 810 may be printed using the particulate dispenser assembly 314, which includes the bulk dispenser 313 and the vacuum nozzle 315 described herein (described in reference to FIGS. 7 and 8). Thus, in such embodiments, when the component (e.g. the mold) is being formed, the print heads 102 may skip over certain locations where a chill needs to be located such that the binder does not consolidate the particulate in such locations. As such, the vacuum nozzle 315 can be used to remove particulate in these locations. Another print head capable of dispensing a different binder can then dispense the chill material into the locations to form the chills. In an embodiment, as an example, the chill material may include a graphene powder mixed with a binder in a slurry. Accordingly, the present disclosure allows for custom chills to be printed in place. Further, as shown in FIG. 21, the chill 810 may have one or more features, such as fingers, for improving cooling efficiency thereof.

Figure 22:
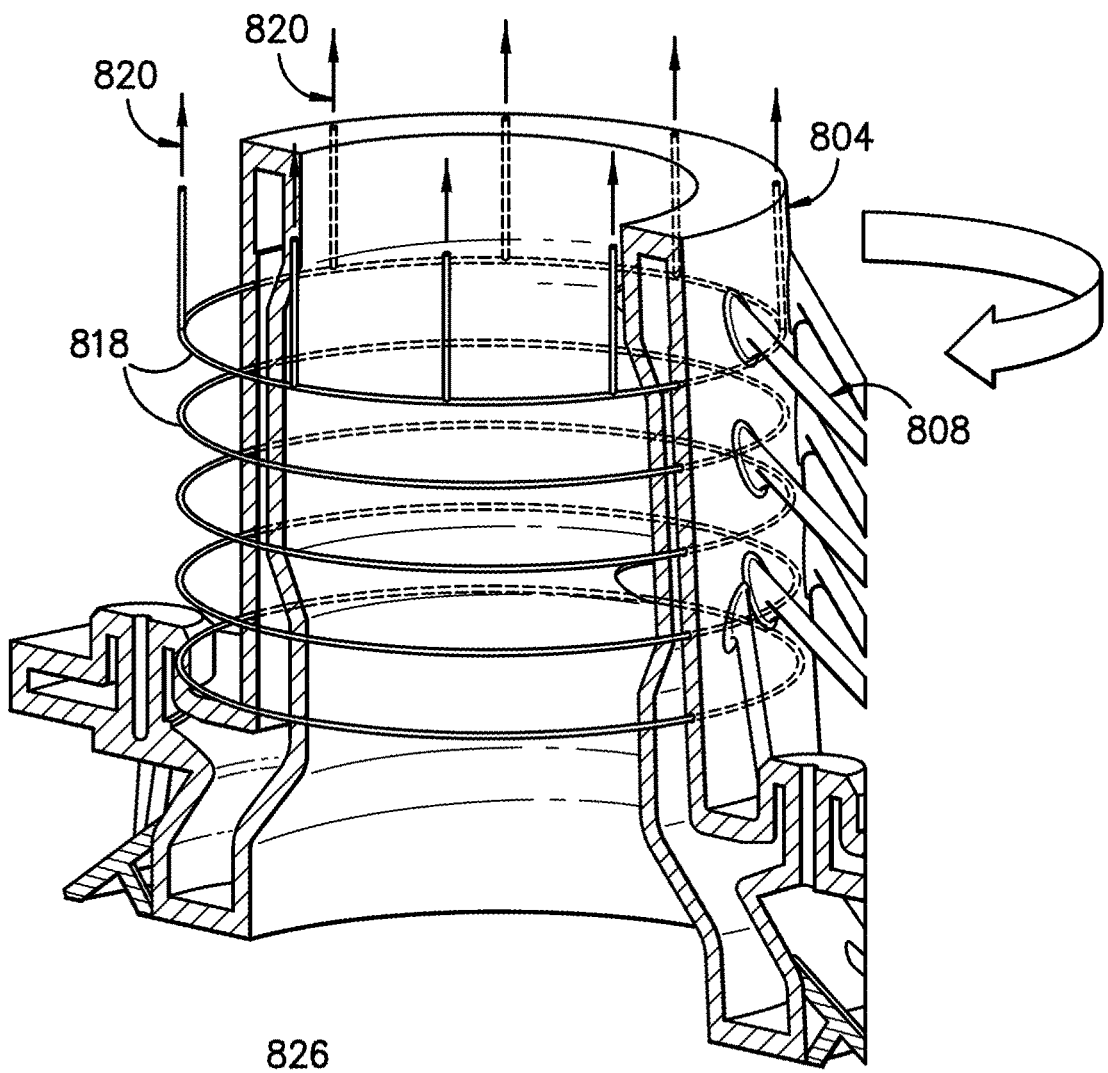
FIG. 22 illustrates a perspective view of an embodiment of a casting mold formed via an additive manufacturing system according to the present disclosure, particularly illustrating channels formed into the mold.

Referring now to FIG. 22, one or more channels 818 can also be built into the printed mold 804 through which a cooling medium 820 can be driven. Thus, such channels 818 are configured to reduce cooling time of the casted part. Such cooling channels 818 can be easily tailored to the local needs inside the mold 804 and can be as complex as necessary. As an example, the cooling medium can be supplied to the chills or to any specific sections of the casting via the channels 818.

Figure 23:
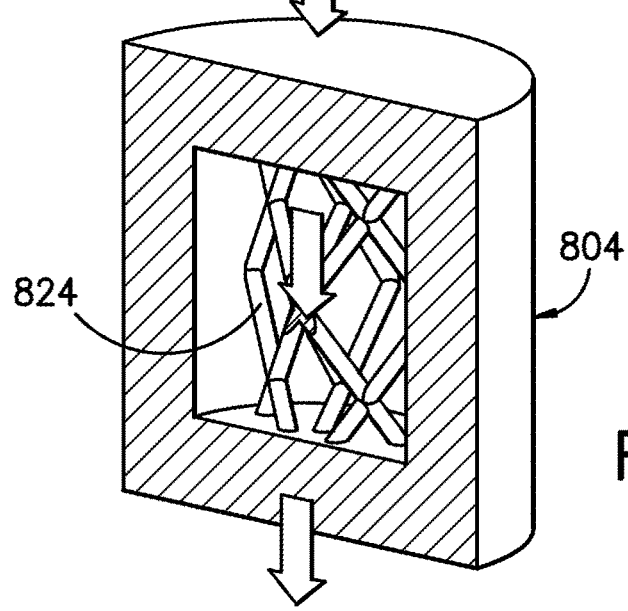
FIG. 23 illustrates a partial, perspective view of an embodiment of a hollowed mold wall of a casting mold formed via an additive manufacturing system according to the present disclosure.
Figure 24:
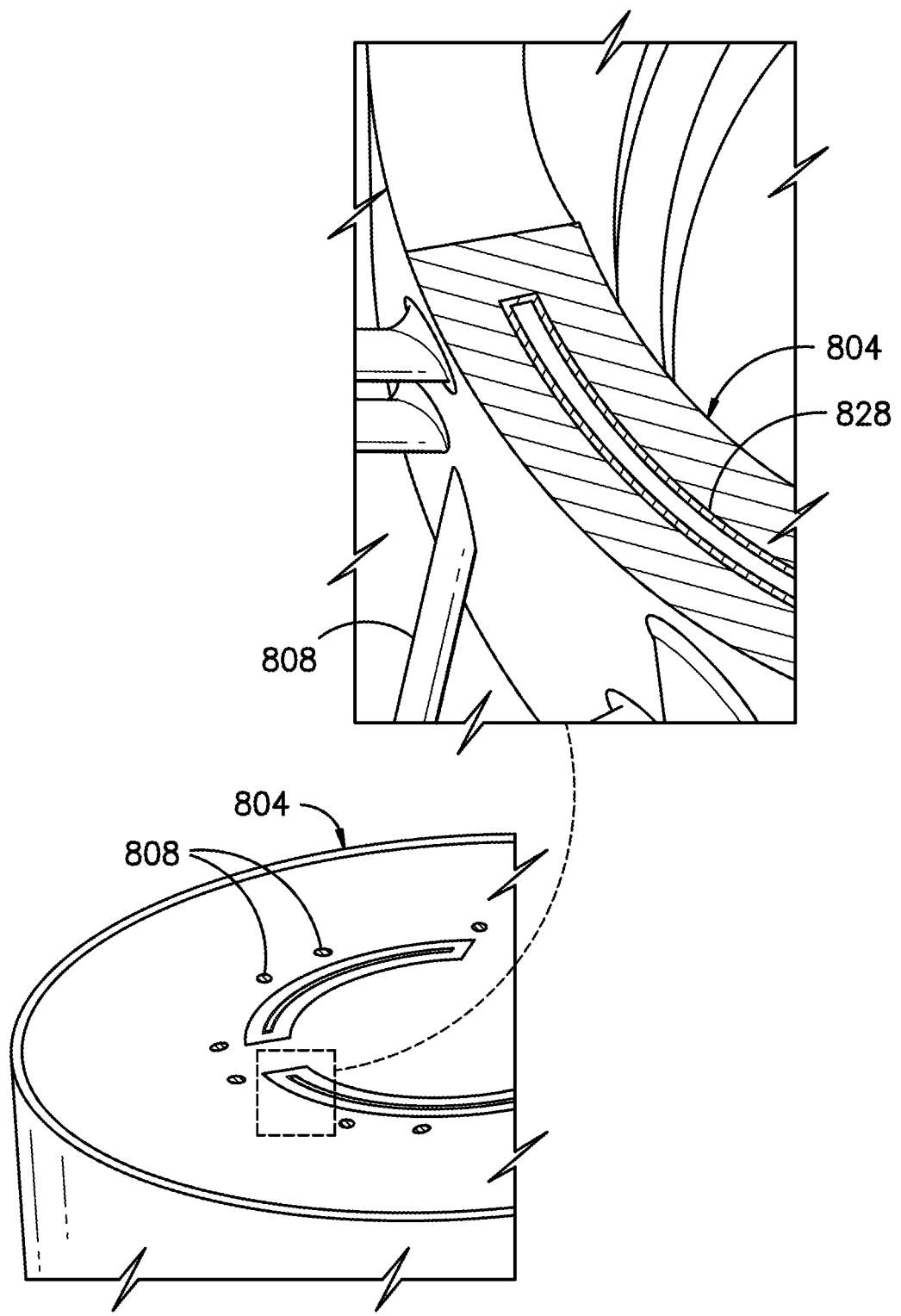
FIG. 24 illustrates a partial, perspective view of an embodiment of a layer of a casting mold formed via an additive manufacturing system according to the present disclosure.
Figure 25:
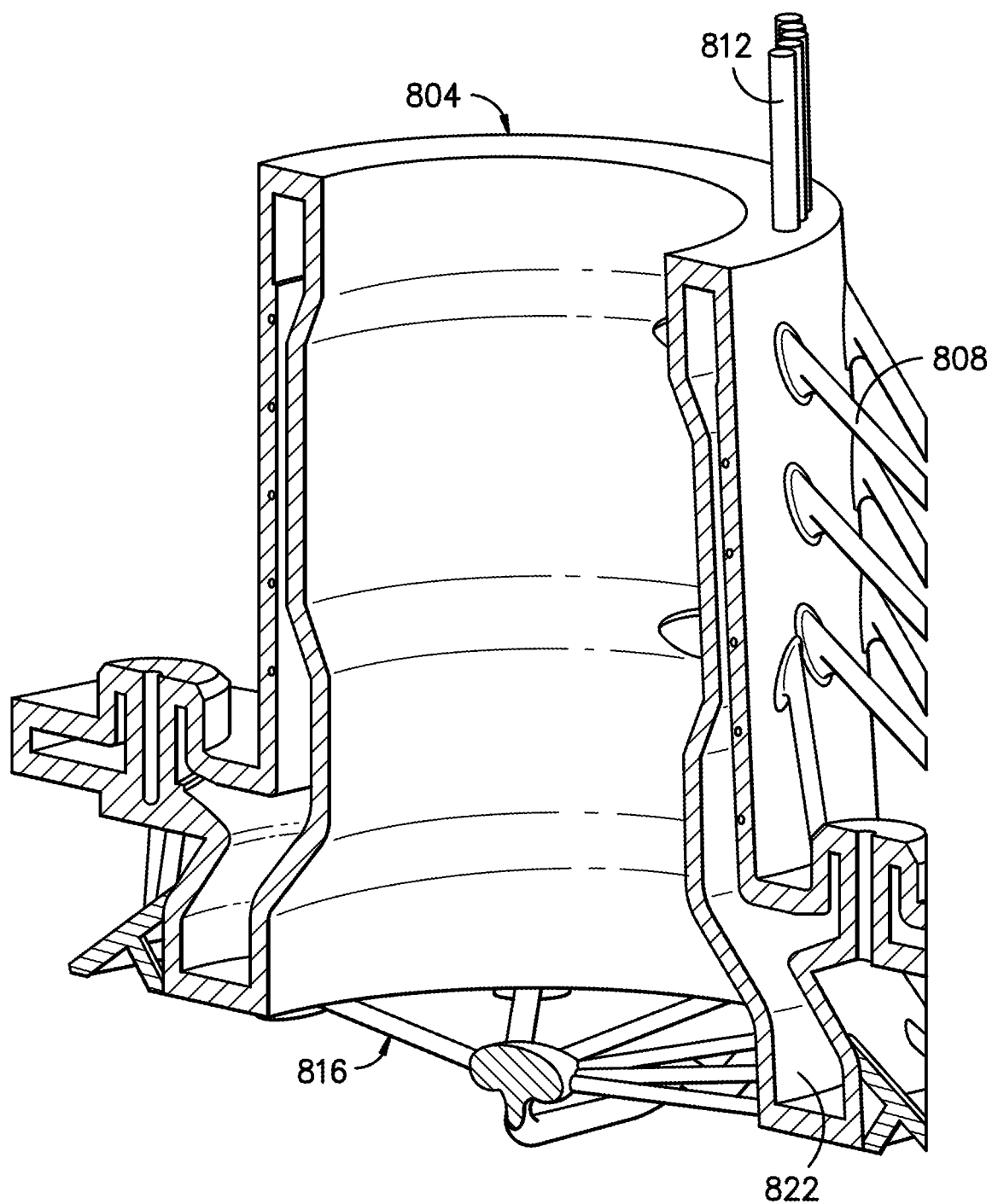
FIG. 25 illustrates a partial, perspective view of an embodiment of a casting mold formed via an additive manufacturing system according to the present disclosure.

Referring specifically to FIGS. 23-25, various views of a complete printed mold 804 for use in a casting process as described herein is illustrated. In particular, FIG. 23 illustrates a partial view of a mold wall of the mold 804 according to the present disclosure; FIG. 24 illustrates an example of one embodiment of a printed layer of the mold 804 according to the present disclosure; and FIG. 25 illustrates a partial, internal perspective view of the mold 804 according to the present disclosure.

Thus, in certain embodiments, molten metal is poured into the feeding system 816 to fill the cavity 822 of the mold 804. Gases may be given off as the molten metal comes into contact with the sand/binder composite. Such gases must be vented to avoid buildup of pressure within the mold 804 to avoid failure of the mold 804. Thus, the printed vents 812 and/or certain areas of more porous material can be included in the mold 804 using the techniques described herein. These vents 812 may also be tailored to direct the venting gases from specific locations to safe location on the mold surface. Moreover, as shown particularly in FIG. 23, the mold walls of the mold 804 can be at least partially hollowed out and provided with a lattice structure 824 therein (e.g. which may be printed therein) to maintain structural integrity thereof, while leaving unbound sand inside, thereby improving gas permeability (e.g. gas flow 826) through the mold 804.

As a result of the features described herein, the additive manufacturing system according to the present disclosure is able to fabricate objects of any complexity and having various binder densities, shapes, etc. In addition, the additive manufacturing system is able to provide a multiple helical fabrication process which may fabricate the objects in less time than at least some known additive manufacturing systems. Moreover, the additive manufacturing system is able to be shipped to remote sites and assembled because the support structure, binder jet print heads, particulate dispensers, recoater assemblies, and actuators are modular components. The mold described herein can then be formed onsite and does not require shipping.

An exemplary technical effect of the methods, systems, and apparatus described herein includes at least one of: a) reducing the time required to fabricate components using an additive manufacturing system, b) providing an additive manufacturing system that is able to fabricate components of any complexity, c) providing an additive manufacturing system that allows a consolidation device and a recoater assembly to operate simultaneously during fabrication of a component, d) simplifying the mechanisms required to deposit particulate onto the build platform, e) reducing the cost of additively manufacturing a component, and f) providing additive manufacturing systems that are modular and able to fabricate components in situ.

Exemplary embodiments of additive manufacturing systems are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, an embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing system for forming a component, the additive manufacturing system comprising:
a build platform configured to receive a particulate;
a particulate dispenser assembly configured to dispense or remove the particulate to or from the build platform, wherein the particulate dispenser comprises a bulk dispenser for dispensing the particulate in bulk and a vacuum nozzle configured for removing the particulate;
a plurality of print heads each comprising at least one binder jet, the binder jets of the plurality of print heads configured to dispense at least one binder in varying densities onto the particulate in multiple locations to consolidate at least a portion of the particulate to form the component having a variable binder density throughout;
a first plurality of arms extending at least partially across the build platform and configured to support the plurality of print heads;
a second arm independent from the first plurality of arms, wherein the bulk dispenser and the vacuum nozzle are coupled to the free end of the second arm at a hinge point, the bulk dispenser and the vacuum nozzle rotatable about the hinge point, wherein the bulk dispenser and the vacuum nozzle are spaced at the free end by about at least about 90 degrees; and at least one actuator assembly configured to rotate the first plurality of arms, the second arm, and the build platform about a rotation axis extending through the build platform and move at least one of the plurality of print heads and the build platform in a build direction perpendicular to the build platform as part of a helical build process for the component.

2. The additive manufacturing system of claim 1, wherein one or more of the plurality of print heads skips over one or more locations in the component containing the particulate such that the at least one binder does consolidate the particulate in the one or more locations, and wherein the vacuum nozzle removes the particulate in the one or more locations, and wherein another one of the plurality of print heads dispenses a different binder into the one or more locations to form one or more chills in the component.

3. The additive manufacturing system of claim 1, wherein one or more of the plurality of print heads is configured for dispensing the at least one binder onto the particulate to form at least one of: a support structure for the component, one or more vents in the component, one or more channels in the component, one or more tubes in the component, one or more protrusions in the component, or one or more holes in the component.

4. The additive manufacturing system of claim 1, wherein the component is a mold used to form a casted metal part.

5. The additive manufacturing system of claim 4, wherein one or more of the plurality of print heads is configured to provide a coating to the mold before casting the metal part.

6. The additive manufacturing system of claim 4, wherein one or more of the plurality of print heads is configured for dispensing the at least one binder onto the particulate to form a feeding system for receiving a molten metal for forming the casted metal part.

7. The additive manufacturing system of claim 1, further comprising at least one recoater blade positioned adjacent the build platform and configured to contact the particulate deposited on the build platform and to distribute the particulate across the build platform, wherein the at least one recoater blade is coupled to a first arm of the first plurality of arms, and wherein the at least one actuator assembly is further configured to rotate the first arm and the at least one recoater blade relative to the build platform.

8. The additive manufacturing system of claim 1, wherein the build platform is circular, and wherein the additive manufacturing system further comprises a cylindrical wall extending around the build platform to define a build container, the rotation axis extending through a center of the build platform.

9. A method of fabricating a component using an additive manufacturing system, the method comprising:
arranging a first plurality of arms at least partially across a build platform, the first plurality of arms supporting a plurality of print heads;
coupling a particulate dispenser to the free end of the second arm at a hinge point, the particulate dispenser comprising a bulk dispenser configured for dispensing particulate and a vacuum nozzle configured for removing particulate, the bulk dispenser and the vacuum nozzle rotatable about the hinge point, wherein the bulk dispenser and the vacuum nozzle are spaced about at the free end by at least about 90 degrees;
depositing a particulate on a build platform via the bulk dispenser, the bulk dispenser;
rotating at least one recoater blade relative to the build platform about a rotation axis extending through the build platform so as to disperse the particulate across the build platform;
rotating the first plurality of arms, the second arm, and the build platform about a rotation axis extending through the build platform and move at least one of the plurality of print heads and the build platform in a build direction perpendicular to the build platform as part of a helical build process for the component; and
dispensing, via a plurality of binder jets secured to the plurality of print heads, at least one binder in varying densities onto the particulate in multiple locations to consolidate at least a portion of the particulate to form the component having a variable binder density throughout.

10. The method of claim 9, further comprising:
skipping over, via one or more of the plurality of print heads, one or more locations in the component containing the particulate such that the at least one binder does consolidate the particulate in the one or more locations;
removing, via the vacuum nozzle, particulate in the one or more locations; and
dispensing, via another one of the plurality of print heads, a different binder into the one or more locations to form one or more chills in the component.

11. The method of claim 9, wherein dispensing, via the plurality of binder jets of the plurality of print heads, the at least one of binder in varying densities onto the particulate in multiple locations to consolidate at least a portion of the particulate to form the component having a variable binder density throughout further comprises forming at least one of a support structure for the component, one or more vents in the component, one or more channels in the component, one or more tubes in the component, one or more protrusions, or one or more holes.

12. The method of claim 9, wherein the component is a mold used to form a casted metal part.

13. The method of claim 10, further comprising forming, via at least one of the plurality of print heads, a coating onto the mold before casting the metal part.

14. The method of claim 13, wherein dispensing, via the plurality of binder jets of the plurality of print heads, the at least one of binder in varying densities onto the particulate in multiple locations to consolidate at least a portion of the particulate to form the component having a variable binder density throughout further comprises:
dispensing the at least one binder onto the particulate to form a feeding system for receiving a molten metal for forming the casted metal part.

15. The method of claim 9, wherein the build platform is circular, and wherein the additive manufacturing system further comprises a cylindrical wall extending around the build platform to define a build container, the rotation axis extending through a center of the build platform.

16. The additive manufacturing system of claim 1, wherein the component is a mold used to form a casted metal part.

17. The additive manufacturing system of claim 16, wherein the component further comprises a coating.

18. The additive manufacturing system of claim 17, wherein the coating comprises a refractory material.

* * * * *